United States Patent [19]

Hiroki

[11] Patent Number: 5,703,841
[45] Date of Patent: Dec. 30, 1997

[54] OPTICAL INFORMATION RECORDING/ REPRODUCING APPARATUS AND METHOD WITH FUNCTION OF ADJUSTING REPRODUCING POWER

[75] Inventor: Tomoyuki Hiroki, Zama, Japan

[73] Assignee: Canon Kabushiki Kaisha, Tokyo, Japan

[21] Appl. No.: 781,141

[22] Filed: Jan. 9, 1997

Related U.S. Application Data

[63] Continuation of Ser. No. 340,393, Nov. 15, 1994, abandoned.

[30] Foreign Application Priority Data

| Nov. 17, 1993 | [JP] | Japan | 5-287851 |
| Nov. 17, 1993 | [JP] | Japan | 5-287852 |
| Nov. 17, 1993 | [JP] | Japan | 5-287853 |

[51] Int. Cl.$^6$ .................................... G11B 11/00
[52] U.S. Cl. ............................. 369/13; 369/116
[58] Field of Search .................. 369/13, 116, 14; 360/114, 59; 365/122; 428/694 ML

[56] References Cited

U.S. PATENT DOCUMENTS

| 5,247,509 | 9/1993 | Nakane et al. | 369/116 |
| 5,335,213 | 8/1994 | Fukumoto et al. | 369/13 |
| 5,359,589 | 10/1994 | Mashimo | 369/116 |
| 5,367,509 | 11/1994 | Fukumoto et al. | 369/13 |
| 5,390,162 | 2/1995 | Fukumoto et al. | 369/116 |
| 5,615,182 | 3/1997 | Murakami et al. | 369/13 |

FOREIGN PATENT DOCUMENTS

| 0524315 | 1/1993 | European Pat. Off. . |
| 0526641 | 2/1993 | European Pat. Off. . |
| 0536404 | 4/1993 | European Pat. Off. . |
| 0549138 | 6/1993 | European Pat. Off. . |

OTHER PUBLICATIONS

Patent Abstracts of Japan, for Kokai No. 4–258831, vol. 17, No. 45, Jan. 1993.
Patent Abstracts of Japan, for Kokai No. 3–16038, vol. 15, No. 136, Apr. 1991.

*Primary Examiner*—Tan Dinh
*Attorney, Agent, or Firm*—Fitzpatrick, Cella, Harper & Scinto

[57] ABSTRACT

In an optical information recording/reproducing apparatus, while a magnetooptical recording medium formed by stacking at least a recording layer, which consists of a perpendicular magnetization film for magnetically holding information, and a reproducing layer is rotated at a fixed angular velocity, a laser beam is applied to the medium from the reproducing layer thereby reproducing information held by the recording layer by transferring the information to the reproducing layer. First, information which indicates a relation of an optimum intensity of the laser beam in reproduction with respect to a radial position on the recording medium, previously recorded on the recording medium, is reproduced. Then, the intensity of the laser beam is adjusted on the basis of the information indicating the relation of the optimum intensity of the laser beam with respect to the radial position on the recording medium.

26 Claims, 23 Drawing Sheets

TEMPERATURE DISTRIBUTION IN TRACK CENTER ALONG DISC TRAVELLING DIRECTION

OPTICAL INFORMATION RECORDING/ REPRODUCING APPARATUS AND METHOD WITH FUNCTION OF ADJUSTING REPRODUCING POWER

This application is a continuation of application Ser. No. 08/340,393, filed Nov. 15, 1994, now abandoned.

BACKGROUND OF THE INVENTION

1. Field of the Invention

The present invention relates to an optical information recording/reproducing apparatus and method and, more particularly, to an optical information recording/reproducing apparatus and method of performing at least one of recording and reproduction of information by using a magnetooptical interaction.

2. Related Background Art

Methods of recording and reproducing information with respect to a disc-like information recording medium (to be referred to as an optical disc hereinafter) by using a magnetooptical interaction (polar Kerr effect) are conventionally known. Among these methods, a medium construction as shown FIGS. 1A to 1C is proposed as a super-resolving technique which realizes a recording density higher than the optical resolving power of reproducing light.

FIG. 1A shows the section of an optical disc as one example of the super-resolving technique. A substrate 20 is usually constructed of a transparent material such as glass or polycarbonate. An enhance layer 21, a reproducing layer 22, a recording layer 23, and a protective layer 24 are stacked in this order on the substrate 20. The arrows in the magnetic materials indicate the directions of magnetization in the films.

The recording layer 23 is a film made of a material, such as TbFeCo or DyFeCo, having a high perpendicular magnetic anisotropy. Recording information is held in accordance with whether the magnetic domain in this layer is directed upward or downward. The reproducing layer 22 is constructed of a material with a large saturation magnetization Ms and a small perpendicular magnetic anisotropy. Although the reproducing layer 22 is a longitudinal magnetization film at room temperature, it becomes a perpendicular magnetization film when a predetermined temperature Tth is reached, since the saturation magnetization Ms decreases.

When an information-reproducing beam is irradiated onto the magnetic film with this arrangement from the substrate side, a temperature gradient as in FIG. 1C is obtained in the center of a data track. When viewed from the substrate, the isotherm of the predetermined temperature Tth is present within a spot as illustrated in FIG. 1B. Therefore, the reproducing layer 22 does not contribute to the polar Kerr effect since the layer becomes a longitudinal magnetization film at the predetermined temperature Tth or lower as discussed above. Consequently, the information in the recording layer 23 is masked and therefore cannot be seen from the reproducing beam. On the other hand, a portion of the reproducing layer 22, that is, at the predetermined temperature Tth or higher, is a perpendicular magnetization film. The direction of magnetization of this portion is the same as that of the recording information due to exchange coupling from the recording layer 23. As a result, the information in the recording layer 23 is transferred only to an aperture which is smaller than the spot, thereby effecting super resolution. A construction of this sort is called RAD (Rear Aperture Detection) because an aperture is formed on the rear side with respect to the direction in which the spot travels on the disc.

FIGS. 2A to 2C illustrate an example of an arrangement of FAD (Front Aperture Detection) in which an aperture is formed on the front side with respect to the spot travelling direction. A reproducing layer 22 in this arrangement is weaker in longitudinal anisotropy than that of RAD. Therefore, at room temperature, magnetic domains in a recording layer 23 are transferred to the reproducing layer 22 through an interlayer 25 due to exchange coupling. The Curie temperature of the interlayer 25 is set at about 100° C. Since the exchange coupling disappears when the medium reaches the Curie temperature of the interlayer 25 upon being heated by a reproducing beam, the direction of magnetization in the reproducing layer 22 becomes longitudinal. By setting the Curie temperature of the interlayer 25 at a predetermined temperature Tth, therefore, the magnetic domains in the recording layer 23 are transferred only on the front side of a spot, which is bounded by the isotherm of the predetermined temperature Tth as in FIG. 2B, realizing super resolution.

A construction as shown in FIGS. 3A to 3C is also proposed as another method of super resolution. A reproducing layer 22, FIG. 3A, is a perpendicular magnetization film with a low coercive force. Therefore, upon application of an initializing magnetic field Hb at room temperature, the directions of magnetization in the reproducing layer 22 are aligned in the direction of the initializing magnetic field regardless of the magnetization direction of a recording layer 23. That is, a domain wall is produced in a portion where the magnetization direction of the recording layer 22 is opposite to the direction of the initializing magnetic field. With the magnetization of the reproducing layer 22 thus initialized, a reproducing beam is irradiated while applying a reproducing magnetic field Hr in a direction opposite to the direction of the initializing magnetic field. In this case, the magnitude of the reproducing magnetic field is set such that in a low-temperature portion in a spot of the reproducing beam, the coercive force of the reproducing layer 22 is higher than the energy which reverses the magnetization of the reproducing layer 22 by using an exchange coupling force from the recording layer 23 and the reproducing magnetic field. That is, in the low-temperature portion, the magnetization of the reproducing layer 22 points in the direction of the initializing magnetic field. Therefore, the magnetization of the recording layer 23 is masked and hence does not contribute to signal reproduction. However, as the temperature is raised by irradiation of the reproducing beam, the coercive force of the reproducing layer 22 decreases, and the magnetization of the reproducing layer 22 is reversed in a portion where a domain wall exists by the exchange coupling force from the recording layer 23 and the reproducing magnetic field. Consequently, the magnetization of the recording layer 23 is transferred to the reproducing layer 22. In this fashion, super resolution is realized in which only a portion where the temperature is a predetermined temperature Tth or higher in the spot shown in FIG. 3B contributes to signal reproduction.

In practice, an interlayer is sometimes formed between the reproducing layer 22 and the recording layer 23 in order to control the energy of a domain wall. However, even this arrangement is identical in principle with that shown in FIGS. 3A to 3C.

Unfortunately, the following three problems are present in the above conventional examples, since the temperature distribution in the spot of the reproducing beam contributes to super resolution.

(1) Two types of disc rotating methods are generally known as methods for use in recording and reproduction of information with respect to an optical disc: one is CLV (Constant Linear Velocity), and the other is CAV (Constant Angular Velocity). The former is a scheme in which the relative linear velocity between a recording/reproducing beam and a disc is held constant. This method is advantageous in increasing the total capacity because recording and reproduction can be performed at the highest density throughout the entire disc area. Since, however, the rotating speed of a disc must be changed in accordance with the recording position of information, the method is disadvantageous in response speed. On the other hand, the latter method is advantageous in response speed because the disc rotating speed is held constant. In this method, however, the capacity cannot be significantly increased, and the recording/reproducing conditions vary in accordance with the information recording position.

A scheme called ZCAV (Zone CAV) is also proposed in which the recording area on a disc is divided into several zones. Data is handled in the same way as in CAV in these zones, and a minimum recording pit in each zone is set near an optical limit value. This method has solved the problem of capacity. Unfortunately, since the disc rotating speed is held constant in ZCAV as in CAV, the problem that the recording/reproducing conditions vary in accordance with the recording position of information remains unsolved.

FIGS. 4A to 4C show the temperature distributions near a spot in the case of RAD, when the inner, intermediate, and outer zones of a disc are scanned with the same reproducing beam intensity. As illustrated in FIGS. 4A to 4C, the isotherm of a predetermined temperature Tth extends to the vicinity of the center of the spot in the intermediate zone where the linear velocity is intermediate (FIG. 4B), and so the super-resolving effect is at an optimum level. When the inner zone is reproduced with the same beam intensity, however, the maximum temperature rises due to a slow linear velocity, as in FIG. 4A, and the isotherm of the predetermined temperature Tth extends to the front side of the spot. Consequently, the aperture becomes too large to reproduce small pits such as those reproduced in the intermediate zone. On the other hand, in the outer zone, the linear velocity is too high to raise the medium temperature to the same level as that in the intermediate zone. Consequently, as in FIG. 4C, the aperture becomes too small, and this makes information reproduction impossible.

(2) In an optical information recording/reproducing apparatus (to be referred to as an optical disc drive hereinafter), the internal temperature is usually higher by 10° to 20° C. than that of the external environment due to generation of heat inside the drive. This produces a difference between the temperature just after a disc is loaded in the optical drive and the temperature when the disc temperature reaches an equilibrium after an elapse of enough time. Consequently, even if the same reproducing power is irradiated in these two states, a difference is produced between the temperature distributions within a spot. The result is a difference in quality between the reproduction signals.

FIGS. 5A and 5B show the temperature distributions around a spot in the case of RAD, when scan is performed with the same reproducing beam intensity just after disc loading and after the temperature reaches an equilibrium with time, respectively. As illustrated in FIGS. 5A and 5B, the isotherm of a predetermined temperature Tth extends to the vicinity of the center of the spot just after disc loading (FIG. 5A), and so the super-resolving effect is at an optimum level. However, when reproduction is performed with the same reproducing beam intensity after temperature rise of the disc, the maximum temperature rises and the isotherm of the predetermined temperature Tth extends to the front side of the spot, as in FIG. 5B. Consequently, the aperture becomes too large to reproduce small pits such as those reproduced just after disc loading. To prevent this, if the reproducing beam intensity is so set that an optimum aperture is obtained after temperature rise of a disc, an aperture is not opened at the temperature just after disc loading since the temperature in a spot does not satisfactorily rise.

(3) Variations in the temperature characteristics between discs or errors in laser power control give rise to the difference in temperature distribution within a spot. This results in a difference between reproduction signals.

FIGS. 6A to 6C show the temperature distributions around a spot in the case of RAD, when the reproducing power is optimum, small, and large. As illustrated in FIGS. 6A to 6C, the isotherm of a predetermined temperature Tth extends to the vicinity of the center of the spot at the optimum power (FIG. 6B), so the super-resolving effect is at an optimum level. When the reproducing power is too small, however, the maximum temperature falls as in FIG. 6A, and the isotherm of the predetermined temperature Tth extends closer to the rear side of the spot. Consequently, the aperture becomes too small to perform information reproduction. On the other hand, when the reproducing power is too large, FIG. 6C, the isotherm of the predetermined temperature Tth extends to the front side of the spot. Consequently, the aperture becomes too large, and this makes it impossible to reproduce small pits such as those reproduced with the optimum power.

SUMMARY OF THE INVENTION

The present invention has been made in consideration of the above conventional problems and has as its object to provide an optical information recording/reproducing apparatus and method which has solved the above problems.

According to one aspect of the present invention, the above object is achieved by an optical information recording/reproducing apparatus in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising:

means for reproducing information recorded beforehand on the recording medium and indicating a relation between a radial position on the medium and an optimum intensity of the laser beam in reproduction; and adjusting means for adjusting the intensity of the laser beam on the basis of the information indicating the relation between the radial position on the medium and the optimum intensity of the laser beam in reproduction.

According to another aspect of the present invention, the above object is achieved by an optical information recording/reproducing apparatus in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, the recording medium including a plurality of tracks and being divided into a plurality of zones, comprising:

determining means for determining an optimum intensity of the laser beam in reproduction by using a buffer zone provided between the zones of the recording medium; and adjusting means for adjusting the intensity of the laser beam in reproduction of the information in accordance with the determined optimum intensity.

According to still another aspect of the present invention, the above object is achieved by an optical information recording/reproducing apparatus in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layers the recording medium including a plurality of tracks and being divided into a plurality of zones, comprising:

determining means for determining an optimum intensity of the laser beam in reproduction by using a zone including one or more tracks including an innermost or outermost track of each of the zones of the recording medium; and adjusting means for adjusting the intensity of the laser beam in reproduction of the information in accordance with the determined optimum intensity.

According to still another aspect of the present invention, the above object is achieved by an optical information recording/reproducing apparatus in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising:

determining means for determining an optimum intensity of the laser beam in reproduction at a plurality of points on the recording medium;

calculating means for calculating an optimum intensity of the laser beam in reproduction in an entire recording area on the recording medium by linear interpolation or polynomial approximation by using the optimal intensity of the laser beam determined at each of the plurality of points; and adjusting means for adjusting the intensity of the laser beam in reproduction of the information in accordance with the calculated optimum intensity.

According to still another aspect of the present invention, the above object is achieved by an optical information recording/reproducing apparatus in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising:

determining means for determining an optimum intensity of the laser beam in reproduction;

adjusting means for adjusting the intensity of the laser beam in reproduction of the information in accordance with the determined optimum intensity; and a timer which is activated before or after the determination of the optimum intensity of the laser beam, wherein the determining means determines the optimum intensity of the laser beam in reproduction at each predetermined period of time on the basis of a time measured by the timer.

According to still another aspect of the present invention, the above object is achieved by an optical information recording/reproducing apparatus in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising:

determining means for determining an optimum intensity of the laser beam in reproduction;

adjusting means for adjusting the intensity of the laser beam in reproduction of the information in accordance with the determined optimum intensity; and detecting means for detecting an internal temperature of the apparatus, wherein the determining means determines the optimum intensity of the laser beam in reproduction for each predetermined temperature rise on the basis of the temperature detected by the detecting means.

According to still another aspect of the present invention, the above object is achieved by an optical information recording/reproducing apparatus in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising:

means for changing an intensity of the laser beam in several steps;

reproducing means for generating a reproduction signal from reflected light of the laser beam from the medium;

differentiating means for differentiating the reproduction signal to output a differential signal;

detecting means for detecting a level of the differential signal;

determining means for determining, as an optimum intensity of the laser beam in reproduction, an intensity of the laser beam at which a maximum level of the differential signal is obtained; and adjusting means for adjusting the intensity of the laser beam in reproduction of the information in accordance with the determined optimum intensity.

According to still another aspect of the present invention, the above object is achieved by an optical information recording/reproducing apparatus in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising:

means for changing an intensity of the laser beam in several steps;

reproducing means for generating an analog reproduction signal from reflected light of the laser beam from the medium;

converting means for converting the analog reproduction signal into a digital signal at a frequency higher than a frequency of the analog reproduction signal;

determining means for detecting a difference between a level of the converted digital signal and a level of a digital signal obtained in an immediately preceding conversion each time conversion is performed, and determining, as an optimum intensity of the laser beam in reproduction, an intensity of the laser beam at which a maximum value of the difference is obtained; and adjusting means for adjusting the intensity of the laser beam in reproduction of the information in accordance with the determined optimum intensity.

According to still another aspect of the present invention, the above object is achieved by an optical information recording/reproducing method in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising the steps of:

reproducing information recorded beforehand on the recording medium and indicating a relation between a radial position on the medium and an optimum intensity of the laser beam in reproduction; and adjusting the intensity of the laser beam on the basis of the reproduced information indicating the relation between the radial position on the medium and the optimum intensity of the laser beam in reproduction.

According to still another aspect of the present invention, the above object is achieved by an optical information recording/reproducing method in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, the recording medium including a plurality of tracks and being divided into a plurality of zones, comprising the steps of:

determining an optimum intensity of the laser beam in reproduction by using a buffer zone provided between the zones of the recording medium; and adjusting the intensity of the laser beam in reproduction of the information in accordance with the determined optimum intensity.

According to still another aspect of the present invention, the above object is achieved by an optical information recording/reproducing method in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, the recording medium including a plurality of tracks and being divided into a plurality of zones, comprising the steps of:

determining an optimum intensity of the laser beam in reproduction by using a zone including one or more tracks including an innermost or outermost track of each of the zones of the recording medium; and adjusting the intensity of the laser beam in reproduction of the information in accordance with the determined optimum intensity.

According to still another aspect of the present invention, the above object is achieved by an optical information recording/reproducing method in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising the steps of:

determining an optimum intensity of the laser beam in reproduction at a plurality of points on the recording medium;

calculating an optimum intensity of the laser beam in reproduction in an entire recording area on the recording medium by linear interpolation or polynomial approximation by using the optimal intensity of the laser beam determined at each of the plurality of points; and adjusting the intensity of the laser beam in reproduction of the information in accordance with the calculated optimum intensity.

According to still another aspect of the present invention, the above object is achieved by an optical information recording/reproducing method in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising the steps of:

determining an optimum intensity of the laser beam in reproduction;

adjusting the intensity of the laser beam in reproduction of the information in accordance with the determined optimum intensity; and starting time measurement before or after the determination of the optimum intensity of the laser beam, wherein the determining step determines the optimum intensity of the laser beam in reproduction at each predetermined period of time on the basis of the measured time.

According to still another aspect of the present invention, the above object is achieved by an optical information recording/reproducing method in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising the steps of:

determining an optimum intensity of the laser beam in reproduction;

adjusting the intensity of the laser beam in reproduction of the information in accordance with the determined optimum intensity; and detecting an internal temperature of an apparatus, wherein the determining step determines the optimum intensity of the laser beam in reproduction for each predetermined temperature rise on the basis of the temperature detected by the detecting step.

According to still another aspect of the present invention, the above object is achieved by an optical information recording/reproducing method in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising the steps of:

changing an intensity of the laser beam in several steps;

generating a reproduction signal from reflected light of the laser beam from the medium;

differentiating the reproduction signal to output a differential signal;

detecting a level of the differential signal;

determining, as an optimum intensity of the laser beam in reproduction, an intensity of the laser beam at which a maximum level of the differential signal is obtained; and adjusting the intensity of the laser beam in reproduction of the information in accordance with the determined optimum intensity.

According to still another aspect of the present invention, the above object is achieved by an optical information recording/reproducing method in which, while a magnetooptical recording medium formed by stacking at least a recording layer, which consists of a perpendicular magnetization film for magnetically holding information, and a reproducing layer whose magnetic coupled state with the recording layer changes in accordance with temperature is rotated at a fixed angular velocity, a laser beam is irradiated onto the medium from the reproducing layer, thereby reproducing information held by the recording layer by transferring the information to the reproducing layer, comprising the steps of:

changing an intensity of the laser beam in several steps;

generating an analog reproduction signal from reflected light of the laser beam from the medium;

converting the analog reproduction signal into a digital signal at a frequency higher than a frequency of the analog reproduction signal;

detecting a difference between a level of the converted digital signal and a level of a digital signal obtained in an immediately preceding conversion each time conversion is performed, and determining, as an optimum intensity of the laser beam in reproduction, an intensity of the laser beam at which a maximum value of the difference is obtained; and adjusting the intensity of the laser beam in reproduction of the information in accordance with the determined optimum intensity.

DETAILED DESCRIPTION OF THE PREFERRED EMBODIMENTS

[First Embodiment]

Figure 7:
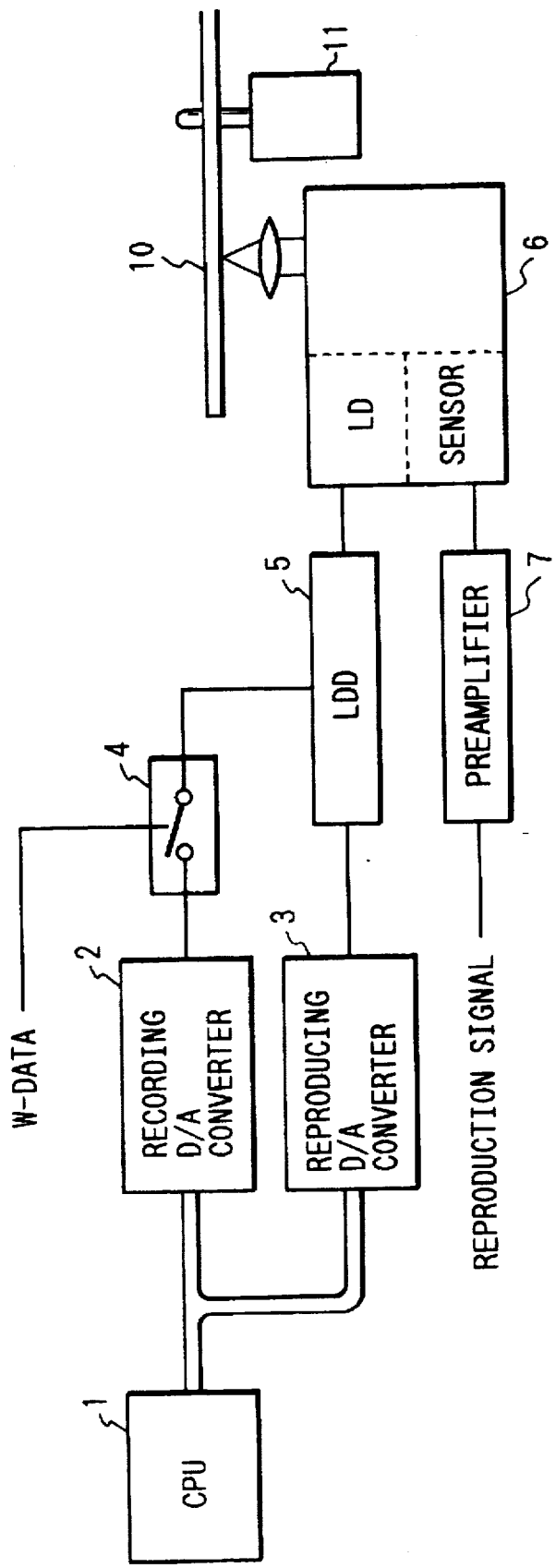
FIG. 7 is a block diagram for explaining the first embodiment of the present invention.

FIG. 7 is a block diagram for explaining the first embodiment of the present invention. Referring to FIG. 7, an apparatus of this embodiment includes a CPU 1, D/A converters 2 and 3, a switch 4, a laser driver circuit 5, an information recording/reproducing head 6, a preamplifier 7, an optical disc 10, and a spindle motor 11.

In performing reproduction, the CPU 1 sets data corresponding to optimum reproducing power, which is determined in accordance with the procedure to be described later, in the reproducing power setting D/A converter 3. The CPU 1 then drives the laser driver circuit 5 in accordance with the set value, thereby causing the laser driver circuit 5 to turn on a laser diode in the optical head 6. Light emitted from the laser diode is focused on the optical disc 10 by the optical head 6. The reflected light is modulated in accordance with recorded information on the disc. Light received by a sensor in the optical head 6 is converted into a voltage by the preamplifier 7, forming a reproduction signal. This signal is demodulated by a demodulator (not shown) to reproduce the information recorded in the optical disc 10.

In performing recording, the CPU 1 sets data in the recording power setting D/A converter 2 and controls the output from the D/A converter 2 to the laser driver circuit 5 via the switch 4. A recording signal from a modulator (not shown) is used as the control signal for the switch 4. By modulating the laser in accordance with the data of this recording signal, recording is performed on the optical disc 10.

Figure 4C:
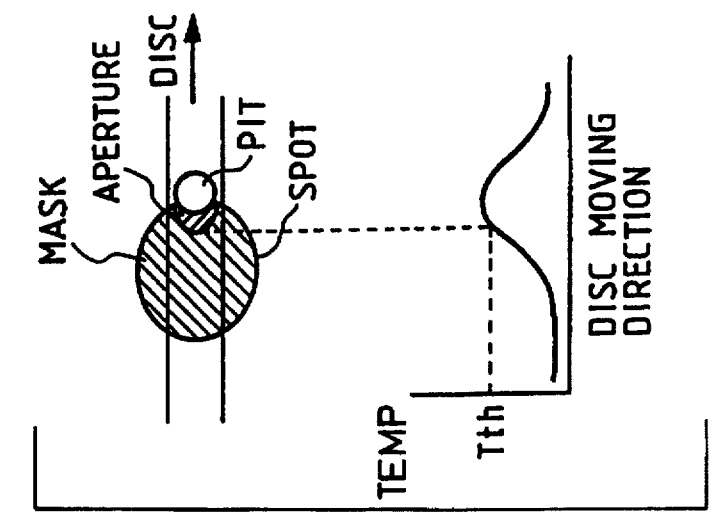
FIGS. 4A to 4C are views for explaining conventional problem (1)
Figure 4B:
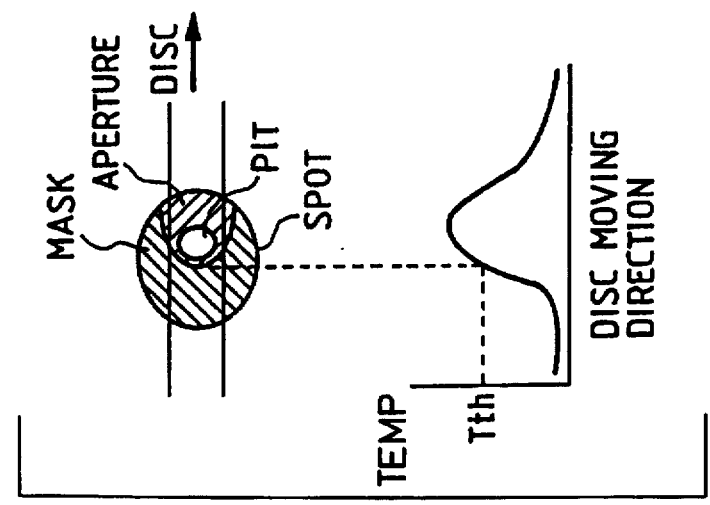
Figure 4A:
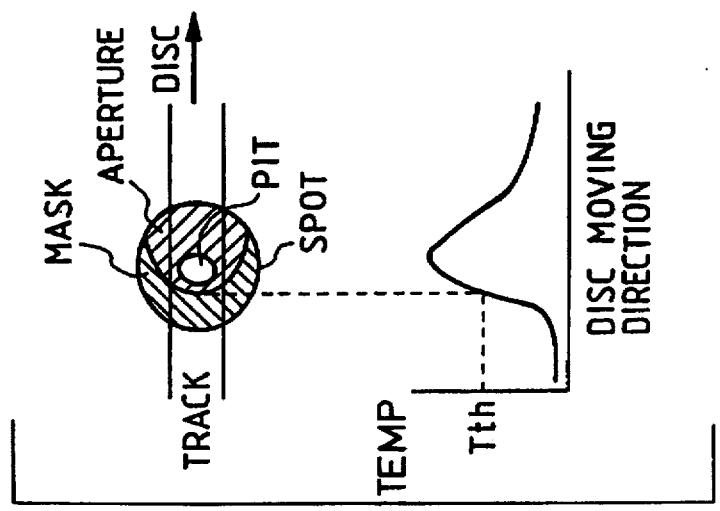
Figure 5A:
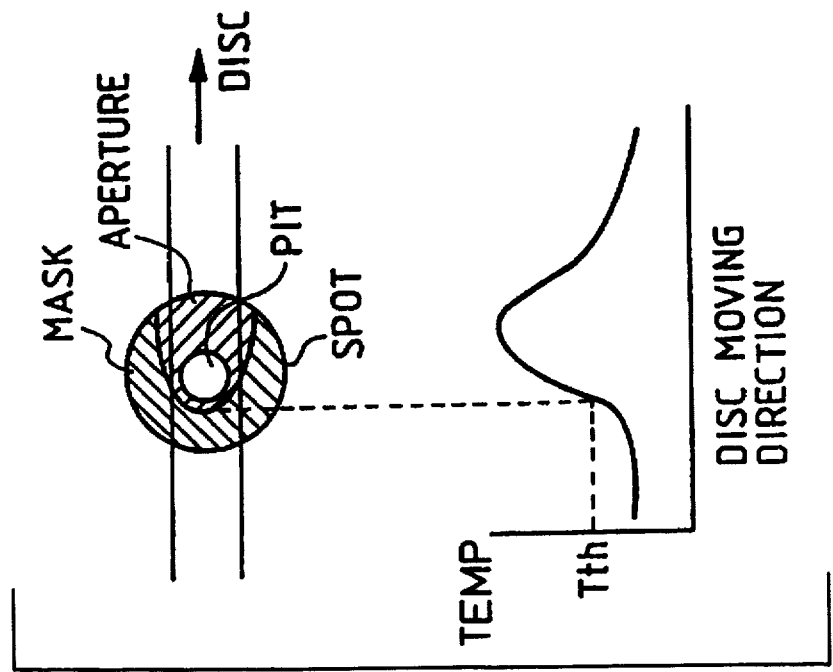
FIGS. 5A and 5B are views for explaining conventional problem (2)
Figure 5B:
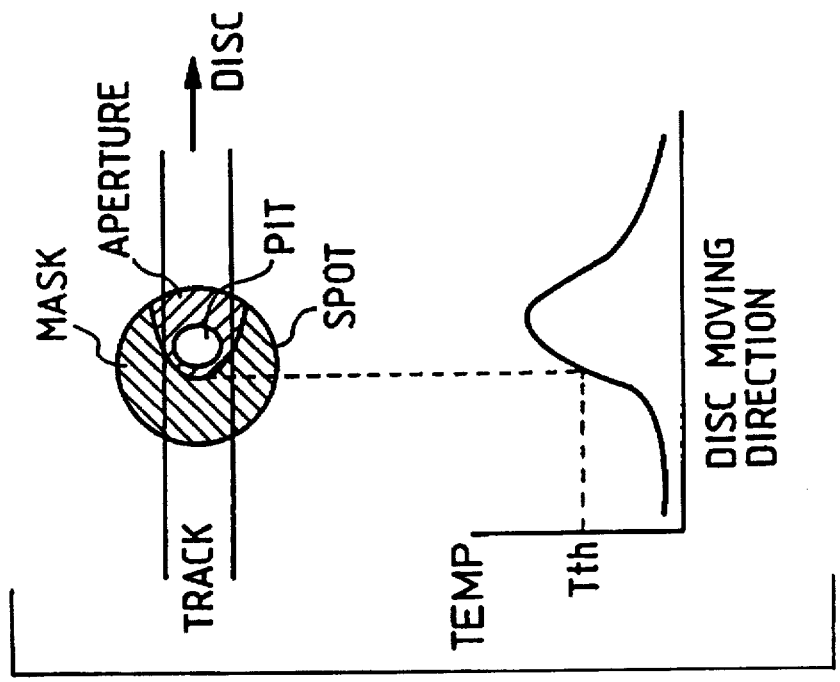
Figure 8A:
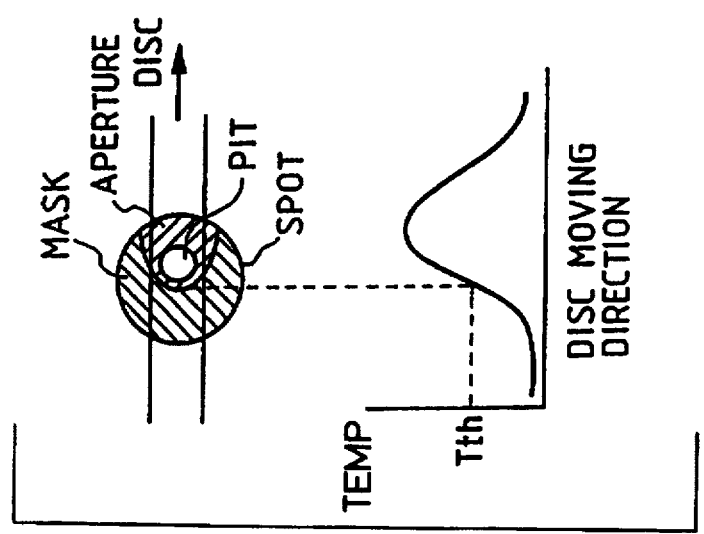
FIGS. 8A to 8C are views showing the principle of the present invention.
Figure 8B:
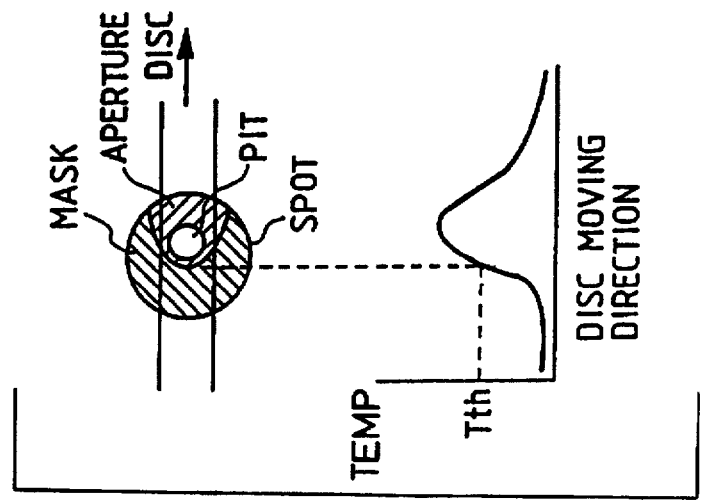
Figure 8C:
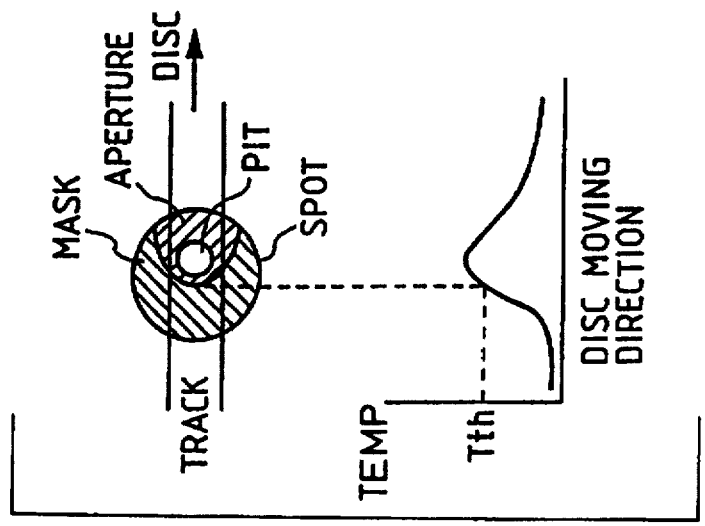

The concept of reproducing power setting will be described below. FIGS. 8A to 8C are views showing the states of a spot and the temperature distributions in the disc moving direction, when this embodiment is applied to RAD. FIGS. 8A to 8C illustrate, in order, the inner zone (where linear velocity is low), the intermediate zone (where linear velocity is intermediate), and the outer zone (where linear velocity is high). FIG. 8B indicates the state of the intermediate zone of a disc. In this state, the same super-resolving effect as in FIG. 4B is obtained, and only a high-temperature portion at a predetermined temperature Tth or higher in the spot contributes as an aperture to reproduction of an information pit. In reproduction of the inner zone of a disc, no optimum super-resolving effect can be obtained in FIG. 4A discussed earlier because the aperture is too large. However, in FIG. 8A an excess rise of the disc temperature is prevented by decreasing the reproducing power in accordance with a decrease in the linear velocity. Consequently, the size of the aperture is set to an optimum one. In reproduction of the outer zone, on the other hand, the aperture is too small in FIG. 4C. In FIG. 8C, however, the disc temperature is sufficiently raised since the reproducing power is raised with increasing linear velocity. Consequently, an optimum aperture shape is obtained.

Figure 9:
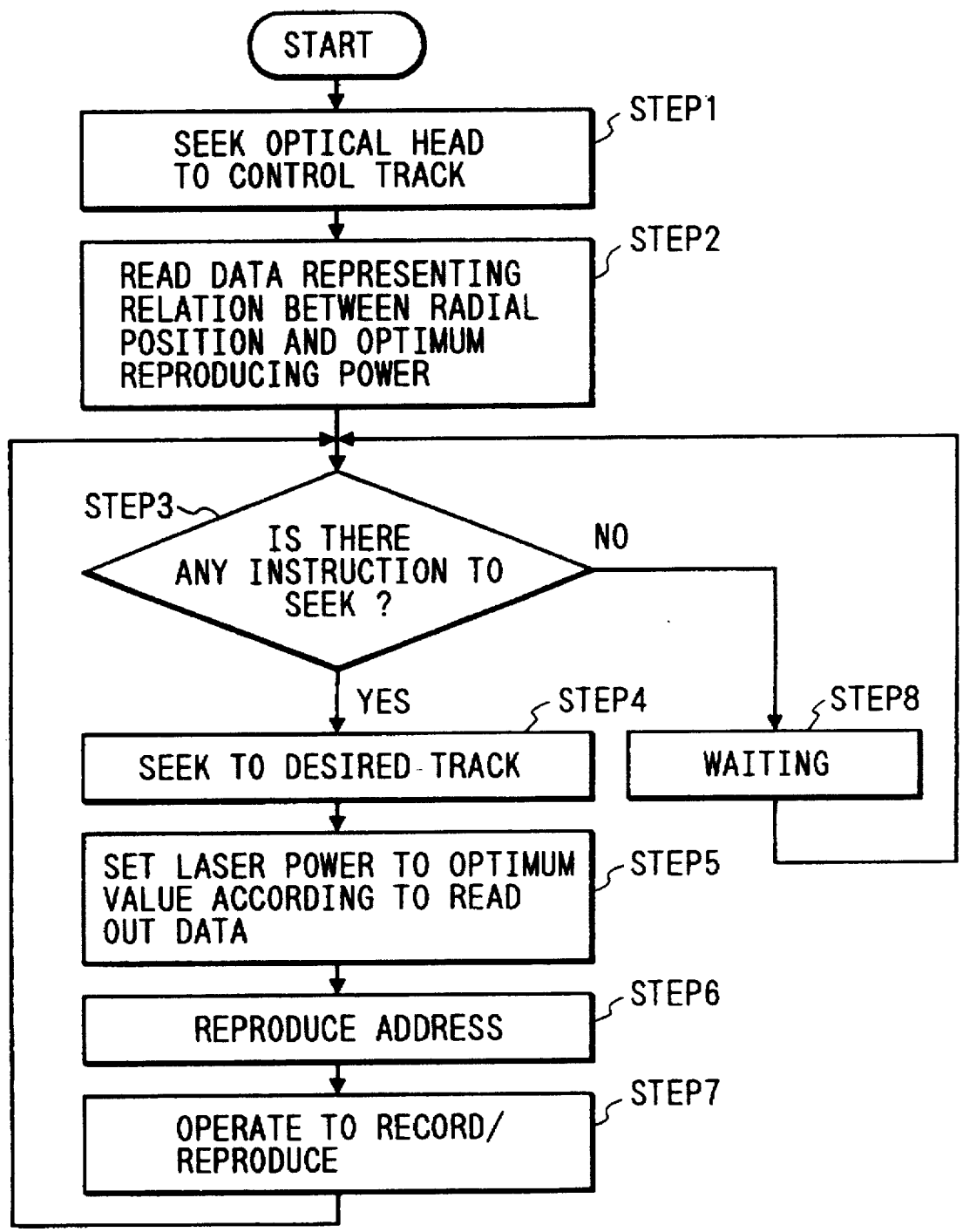
FIG. 9 is a flow chart for explaining the operation of the first embodiment of the present invention.

In actually performing reproduction, the relation between the radial position and the optimum reproducing power is used. That is, this relation is measured beforehand (e.g., in shipment from a factory), and the measurement result is recorded in a control track of a disc as information concerning the disc. Upon insertion of the disc in the drive, the optical head 6 is sought to the control track to reproduce the data, and the CPU 1 sets reproducing power on the basis of the reproduced data. Consequently, optimum reproducing power can be obtained at any instant (see FIG. 9). That is, an optimum super-resolving effect is obtained throughout the entire data area of a disc, and this makes it possible to reproduce a pit with a higher density than the optical resolving power of a spot. The reproducing power need be set at a certain value even in reproducing the information concerning a disc. Since, however, the proportion of this reproducing power information in the entire capacity of a disc is small, the information need only be recorded in a pit of a size which can be reproduced without the super-resolving effect. Consequently, the reproducing power margin increases to allow reproduction of the information even if the reproducing power somewhat falls outside the actual optimum power range.

This embodiment has been explained by taking RAD as an example, but it is naturally possible to obtain an identical effect in reproducing a FAD-type disc. In addition, in this embodiment a longitudinal magnetization film is used as the reproducing layer, and this reproducing layer becomes a longitudinal magnetization film in a portion corresponding to a mask. However, it is obvious that the present invention is not limited to this film arrangement. For example, the arrangement illustrated in FIGS. 3A to 3C, in which the directions of magnetization of a reproducing layer consisting of a perpendicular magnetization film are aligned in one direction, as a mask, by using the initializing magnetic field, and information is reproduced by transferring magnetization of a recording layer only in a high-temperature portion, does not depart from the scope of the idea, i.e., reproducing information while changing the transfer state of magnetization in accordance with the film temperature, which is the characteristic feature of the present invention. That is, the arrangement as in FIGS. 3A to 3C can, of course, achieve an identical effect by use of the arrangement in which the reproducing power is changed in accordance with the information signal reproduction position on a disc, as discussed in this embodiment.

Figure 1A:
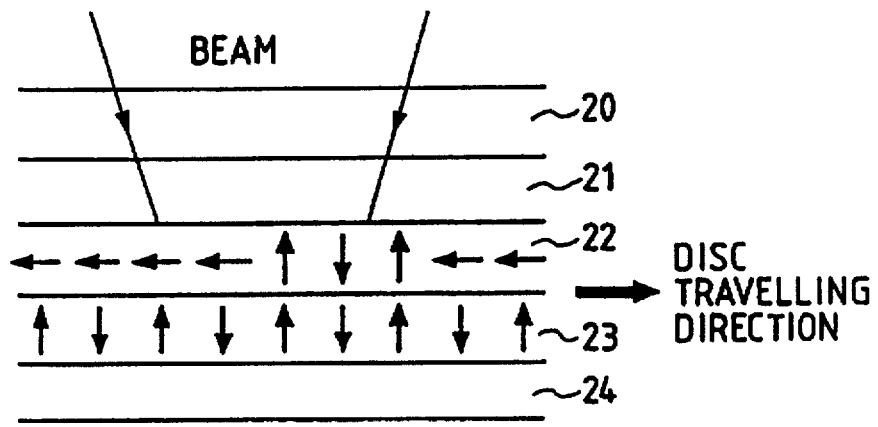
FIGS. 1A to 1C are views showing the principle of a conventional RAD-type disc.
Figure 1B:
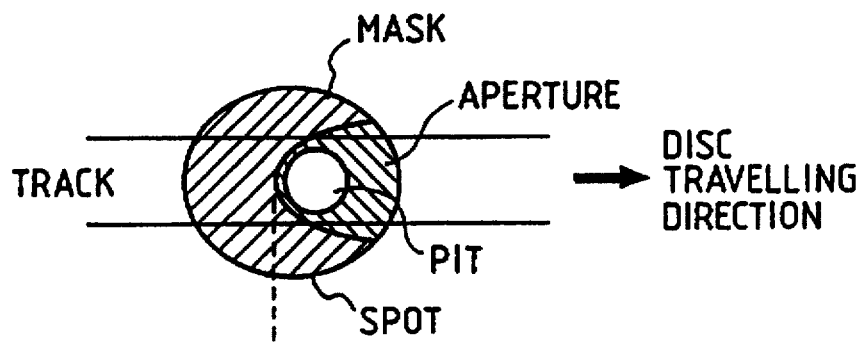
Figure 1C:
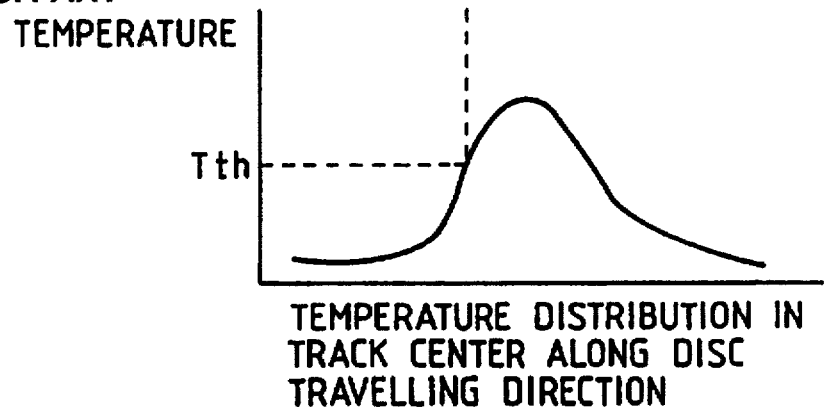
Figure 2A:
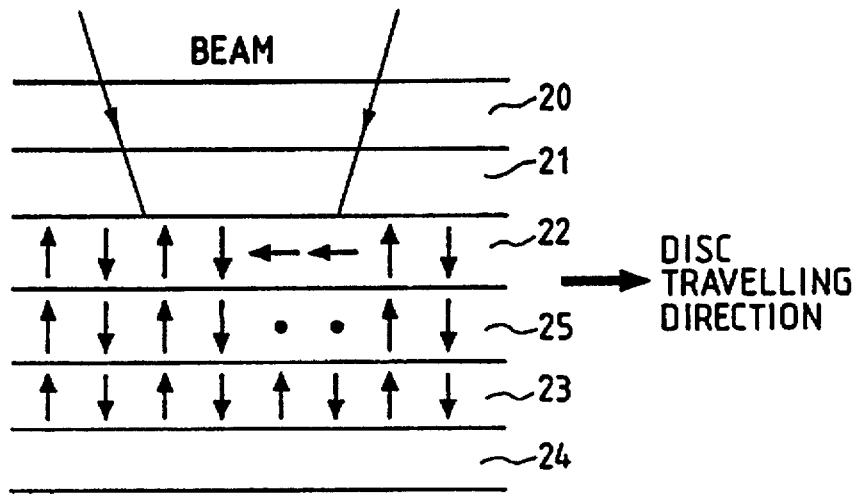
FIGS. 2A to 2C are views showing the principle of a conventional FAD-type disc.
Figure 2B:
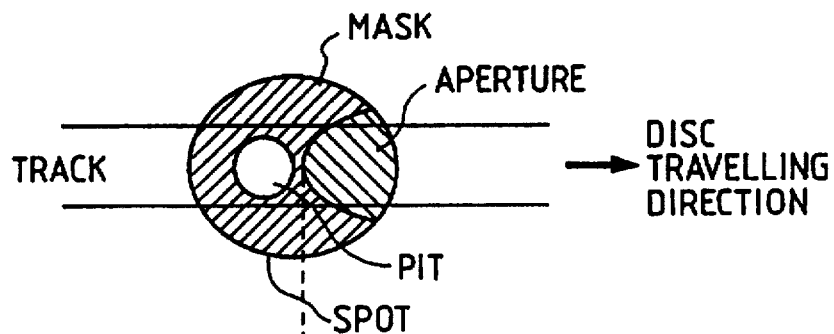
Figure 2C:
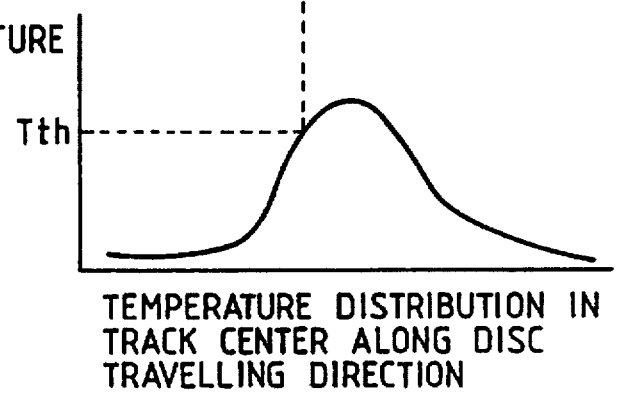
Figure 3A:
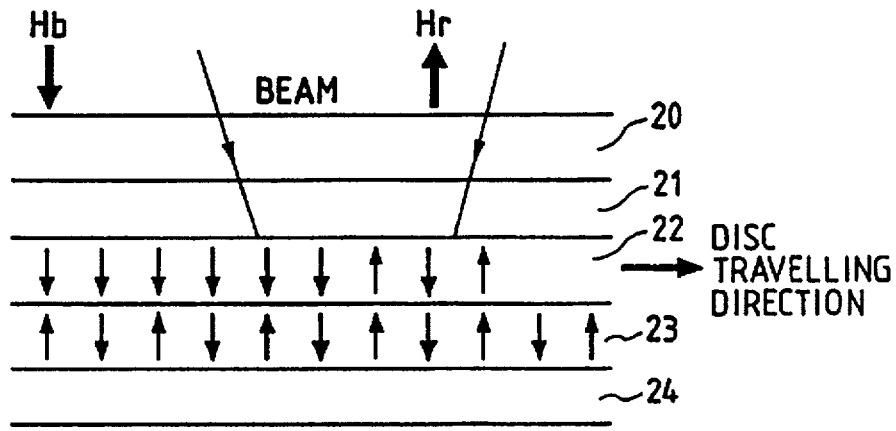
FIGS. 3A to 3C are views showing the principle of a conventional RAD-type disc using a perpendicular magnetization film.
Figure 3B:
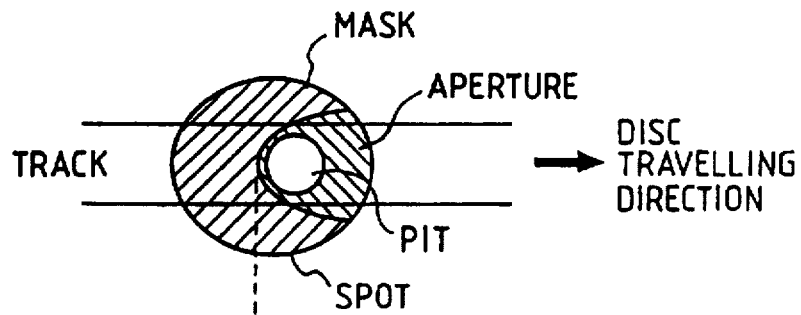
Figure 3C:
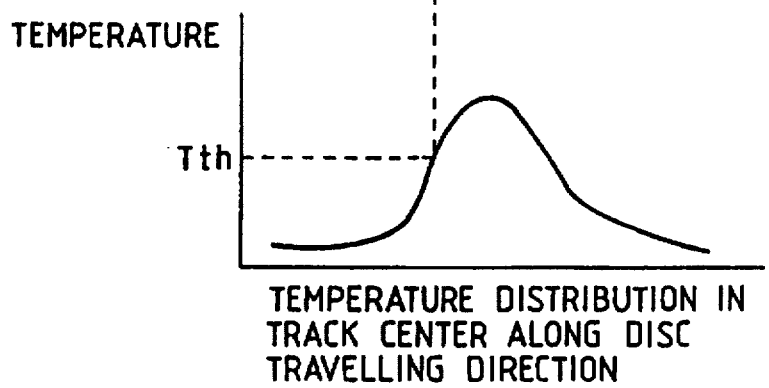

Note that the enhance layer and the protective layer of the discs shown in FIGS. 1A, 2A, and 3A are used to enhance the Kerr effect and protect the magnetic layer, respectively, and are irrelevant to the essence of the present invention. Therefore, these layers can be omitted from the structure.

[Second Embodiment]

Figure 10:
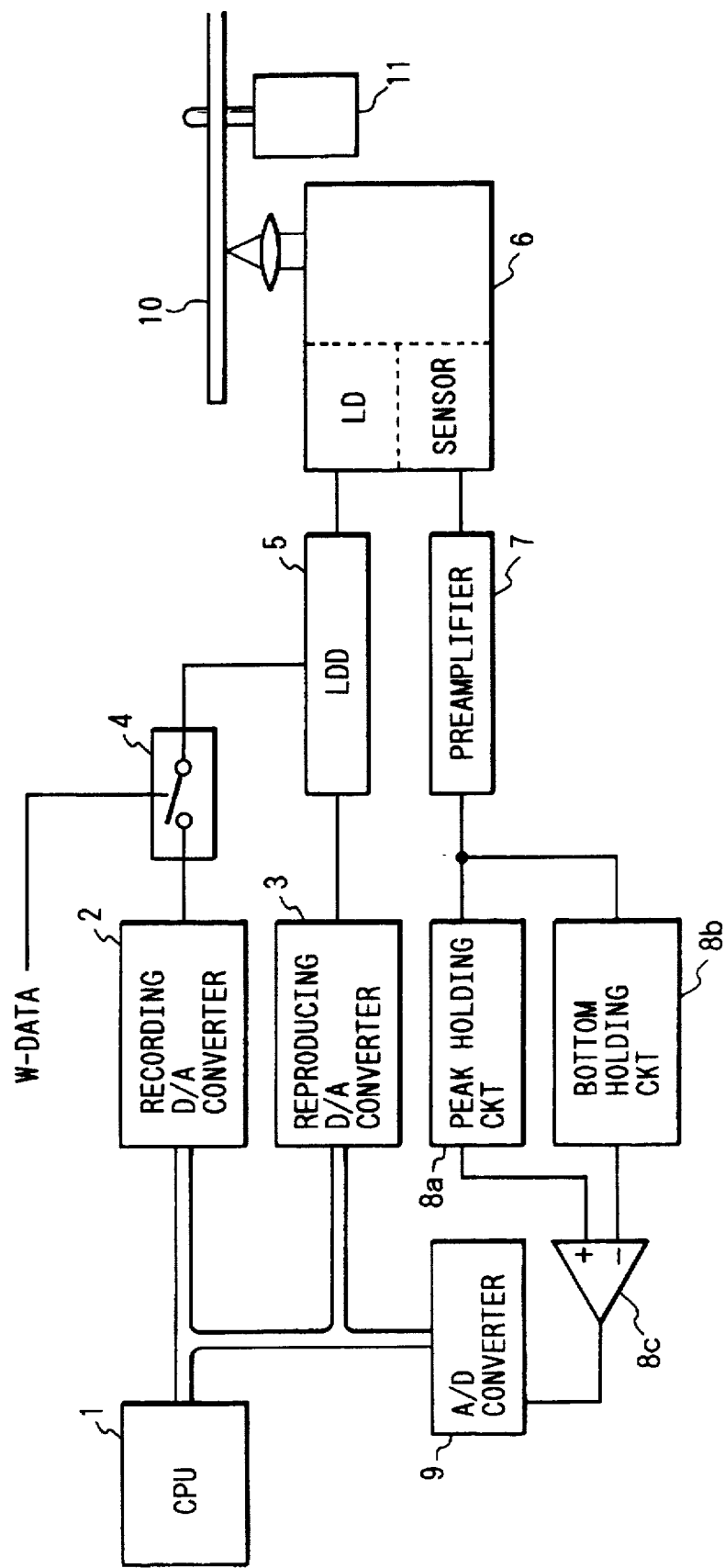
FIG. 10 is a block diagram for explaining the second to sixth embodiments of the present invention.

The second embodiment of the present invention will be described in detail below with reference to FIG. 10. Note that the same reference numerals as in FIG. 7 denote parts having the same functions in FIG. 10, and a detailed description thereof will be omitted. Parts added to the configuration shown in FIG. 7 are a peak holding circuit 8a, a bottom holding circuit 8b, a differential amplifier 8c, and an A/D converter 9. As in FIG. 7, a CPU 1 sets data in D/A converters 2 and 3 for recording power and reproducing power, respectively. The CPU 1 also monitors the output from a preamplifier 7 via the peak holding circuit 8a, the bottom holding circuit 8b, the differential amplifier 8c for detecting the difference between the output from the peak holding circuit 8a and the output from the bottom holding circuit 8b, and the A/D converter 9, thereby detecting the amplitude of an information signal. That is, when optimum reproducing power corresponding to an information recording position is unknown, the CPU 1 can adjust the reproducing power to an optimum level by monitoring the amplitude of an information signal.

Figure 11:
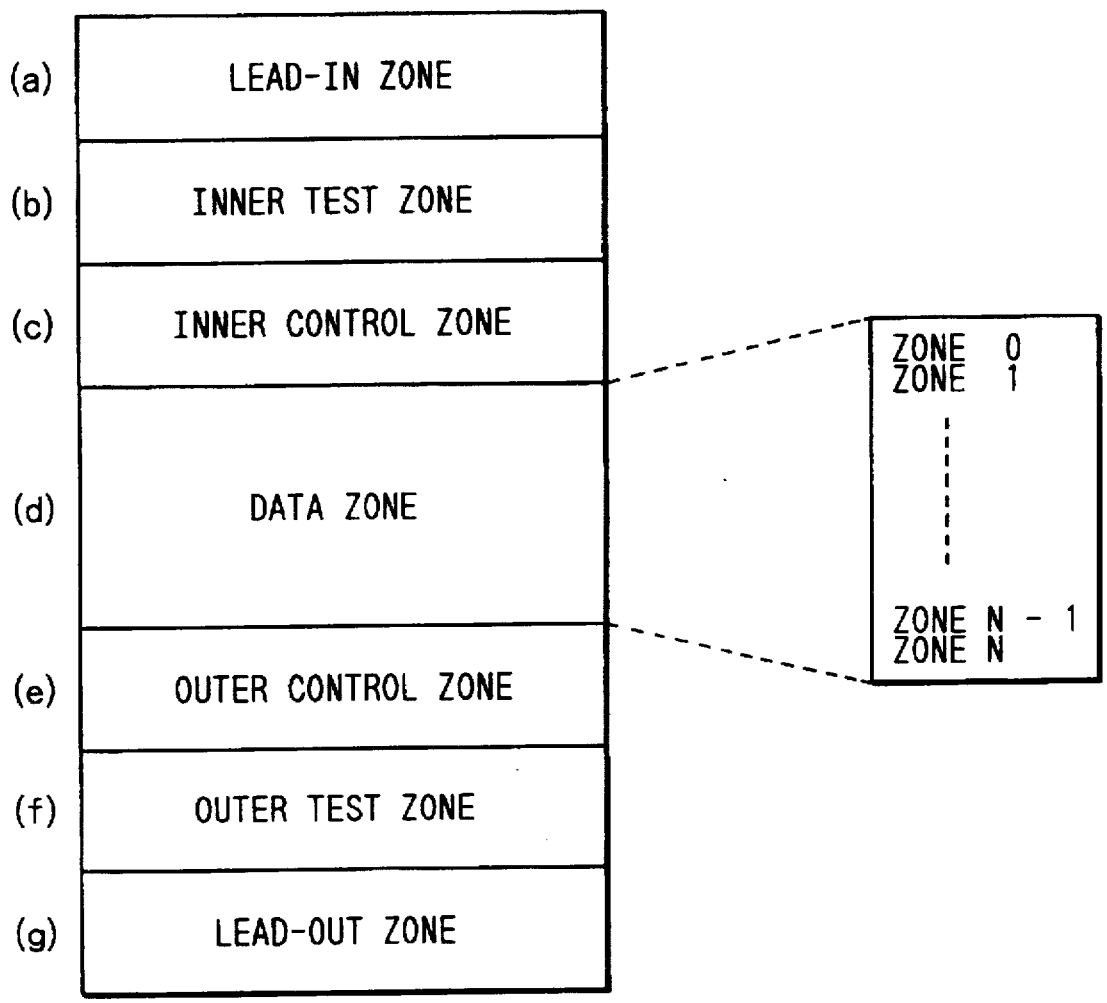
FIG. 11 is a view showing the format on a disc according to the present invention.

FIG. 11 shows an example of the format of an information area of a common optical disc. Individual portions in FIG. 11 have the following functions.

(a) Lead-in Zone . . . a zone for performing lead-in or servo adjustment in focus control and tracking control for allowing a reproducing beam to follow information tracks on an optical disc.

(b) Inner Test Zone . . . a test zone for performing adjustment of recording power in the inner zone.

(c) Inner Control Zone . . . a zone in which information concerning a disc is written; i.e., servo information, a limit value of reproducing power below which information is not destroyed, erase conditions, and like information are written.

(d) Data Zone . . . a zone effective for data storage.

(e) Outer Control Zone . . . an outer zone in which the same information as in (c) is written.

(f) Outer Test Zone . . . a test zone for performing adjustment of recording power in the outer zone.

(g) Lead-out Zone . . . a buffer zone in the outer zone.

Of these zones, test zones (b) and (f) are used only in the test of normal recording power. That is, in these zones, while the recording power is varied in several steps, data of a predetermined pattern is recorded at each level of the recording power, and the recorded data are reproduced (the reproducing power is held constant). The recording power by which the highest reproduction signal level is obtained is used as optimum recording power.

In this embodiment, therefore, optimum recording power Pwi at certain reproducing power is obtained in the inner test zone. Thereafter, a signal recorded at Pwi is reproduced at several levels of reproducing power to obtain reproducing power Pri by which the highest signal level is obtained. An optical head is then moved to the outer test zone to obtain optimum reproducing power Pro in the same fashion. As discussed earlier, the linear velocity in the inner zone is different from that in the outer zone. Therefore, the values of Pri and Pro differ from each other due to the difference in the super-resolving effect.

It is considered that when the linear velocity is held constant, the reproducing power and the temperature rise of a disc (the difference between the maximum temperature in a portion irradiated with a laser and the temperature in an unexposed portion) are nearly directly proportional. In addition, the linear velocity and the reproducing power vary almost linearly when the maximum temperature in the laser-irradiated portion is held constant. Therefore, assuming that the reproducing power obtained in the inner test zone at a radial position Ri is Pri and the reproducing power in the outer test zone at a radial position Ro is Pro, reproducing power Pr for reproducing data at a radial position R can be calculated by Equation (1) below, $$Pr=(Pro-Pri)*(R-Ri)/(Ro-Ri)+Pri \qquad (1)$$

or by $$Pr=(Pro-Pri)*(R-Ro)/(Ro-Ri)+Pro \qquad (1)'$$

In the data zone, therefore, a radial position R is obtained from the track number to be reproduced, and an optimum reproducing power is calculated and set from this value. Consequently, optimum reproduction conditions can be obtained at all times. It is also possible to improve the measurement accuracy in calculating Pwi(Pwo) and Pri(Pro) by repeatedly calculating Pwi(Pwo) using the calculated Pri(Pro).

In this embodiment, an optimum reproducing power is obtained from the track number. However, in an arrangement in which a radial position sensor is attached to an optical head and the radial position is obtained from the sensor output, it is of course possible to obtain the reproducing power from the sensor output, Pri, and Pro.

[Third Embodiment]

As mentioned earlier, general optical discs employ the format called ZCAV having the advantages of a large total capacity and a high speed, in which the data zone (consisting of a plurality of tracks) is divided into several zones (zones 0 to N) as in FIG. 11. In each zone, data is handled in the same manner as in CAV, and the recording pit length in the innermost zone in each zone is set to correspond to the spot size of a reproducing beam or to the limit which is determined by the super-resolving effect of the disc. When these zones are arranged continuously, therefore, tracks whose boundaries are adjacent to each other have different pit lengths or clock frequencies. These adjacent tracks are also different in the arrangement of a preformat portion which is recorded as projections and recesses in a substrate for each sector as a unit of information recording and reproduction. This sometimes brings about a leak of a signal from a neighboring track or a problem in an access method. Therefore, it is a common practice to provide a buffer zone with several tracks between individual zones. Although this buffer zone is not used in information recording by a user, it can be satisfactorily used in test recording and reproduction.

Figure 12:
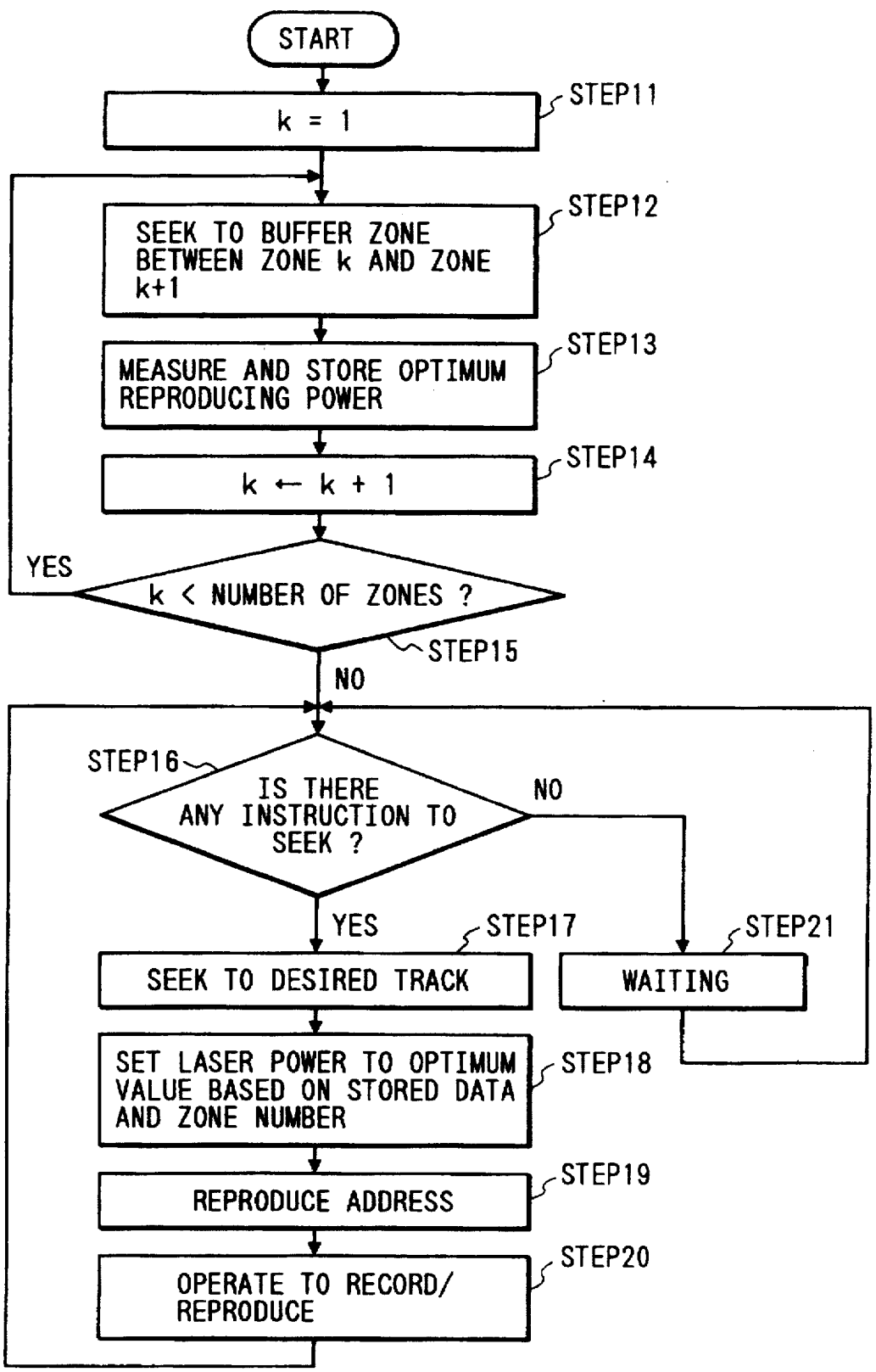
FIG. 12 is a flow chart for explaining the operation of the third embodiment of the present invention.

In this embodiment, in addition to the inner and outer test zones described in the second Embodiment, similar test recording and reproduction are also performed in several buffer zones between the zones, thereby obtaining an optimum recording power and an optimum reproducing power (see FIG. 12). However, this measurement need not be performed in buffer zones between all of the zones; i.e., only a minimum measurement by which a necessary quality of a reproduction signal can be obtained need be performed. This is so because the rise time upon each insertion of a disc increases if the number of measuring points is unnecessarily increased.

As discussed above, the test is done only at an appropriate number of points, and the relation between the radial position R and the optimum reproducing power Pr, as represented by Equation (2) below, is derived by use of a well-known approximation method, such as the least squares method:

$$Pr=a \cdot R+b \qquad (2)$$

where a and b are constants.

Stable signal reproduction is possible throughout the entire area of a disc even with the use of Equation (2) instead of Equation (1) mentioned earlier.

[Fourth Embodiment]

In the above third embodiment, measuring points are linearly interpolated. As a method with a higher accuracy, however, there is a method by which the relation between the radial position R and the optimum reproducing power Pr is calculated by a polynomial. FIGS. 8A to 8C show changes in the temperature distribution when the linear velocity is altered. In this case the maximum temperature which is reached upon laser irradiation is held constant by changing the reproducing power in accordance with the linear velocity, thereby adjusting the position of Tth in the center of a track. However, in some instances it is not possible to obtain an optimum aperture only by adjusting the maximum temperature due to, e.g., the difference in thermal conductivity between discs. More specifically, in some cases the optimum reproducing power does not linearly change because the aperture shape also changes due to the difference in the temperature distribution in a spot which is caused by the linear velocity. Therefore, after the optimum reproducing power is measured in several buffer zones in the same way as in the third Embodiment, the relation between the radial position R and the optimum reproducing power Pr can be calculated by using a polynomial. That is, assuming the radial positions at which the measurement is performed are R1, R2, . . . , Rn and the values of the optimum reproducing power at these positions are Pr1, Pr2, . . . , Prn, respectively, the reproducing power Pr can be represented by Equation (3) below as a function of the radial position R:

$$Pr(R) = a_{n-1} \cdot R^{n-1} + a_{n-2} \cdot R^{n-2} + \ldots + a_1 \cdot R + a_0 \qquad (3)$$

Note that $$Pr(R1) = Pr1, Pr(R2) = Pr2, \ldots, Pr(Rn) = Prn$$

Since Equation (3) is a polynomial of degree (n−1) and the number of measuring points is n, coefficients $a_0, a_1, \ldots, a_{n-1}$ can be uniquely determined.

Figure 13:
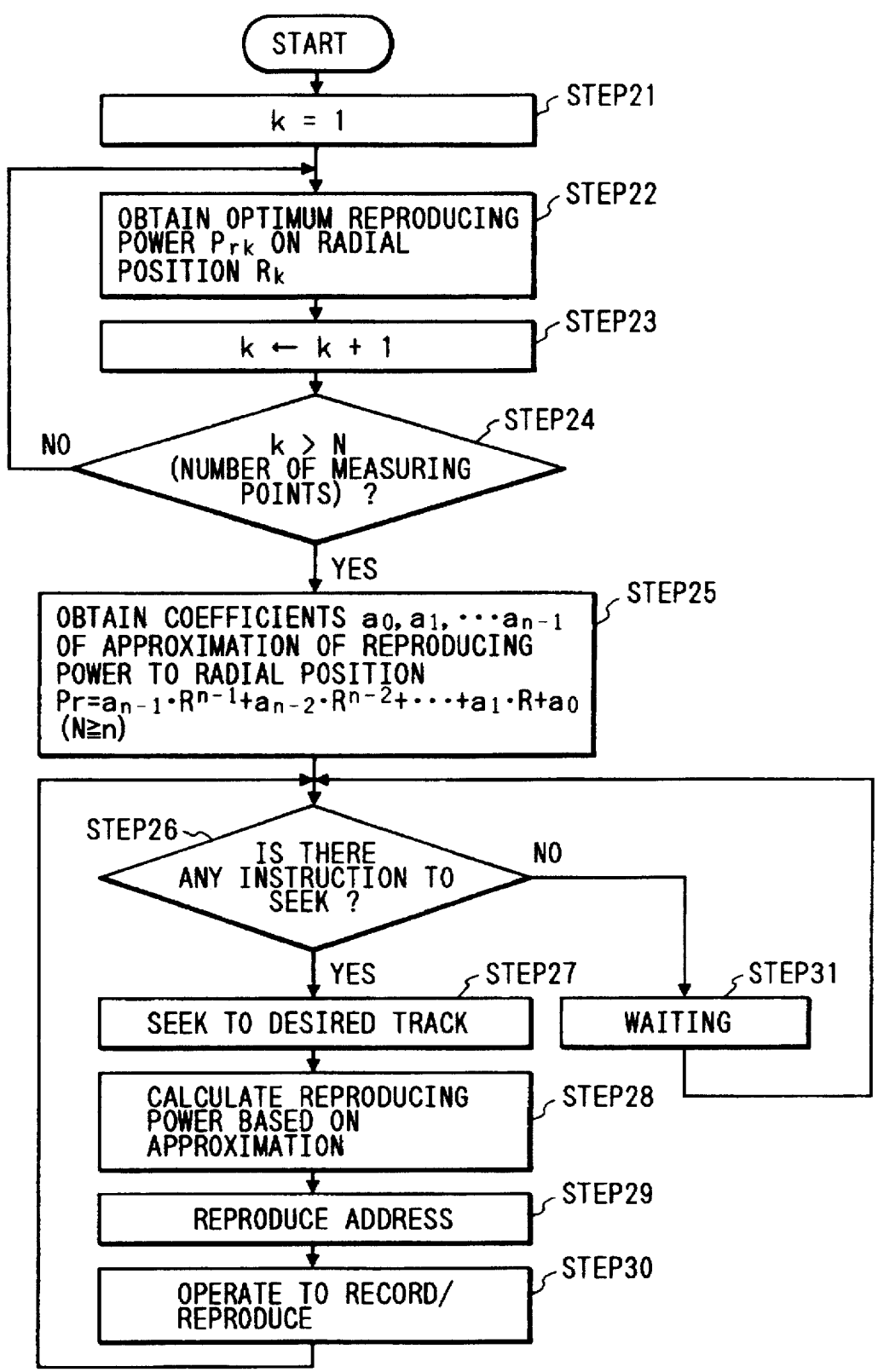
FIG. 13 is a flow chart for explaining the operation of the fourth embodiment of the present invention.

After the optimum reproducing power is obtained at three or more measuring points in the same manner as in the third Embodiment, the reproducing power at each radial position is calculated in the form of a polynomial of degree (n−1) for the number n of measuring points (see FIG. 13). This further improves the reliability in reproduction.

[Fifth Embodiment]

In the third Embodiment, the number of measuring points is n, and the relation between the radial position R and the reproducing power Pr is given by a polynomial of degree (n−1). However, approximation can also be used to simplify the relation and improve the measurement accuracy. That is, when the number of measuring points is n, the relation between the radial position R and the reproducing power Pr can be approximated to a polynomial of degree k (n−1>k) by using a method such as the least squares method or Lagrangian interpolation.

It is considered that a polynomial of degree two or three is satisfactory in practice. Therefore, it is only necessary to take 4 to 5 points as the measuring points in order to improve the accuracy of the approximation.

[Sixth Embodiment]

In each of the third to fifth Embodiments, buffer zones between zones are used to perform test recording and reproduction for obtaining the relation between the radial position R and the reproducing power Pr. However, since the buffer zones contain no information such as a track address, it may sometimes be difficult for a recording/reproducing apparatus to perform recording.

Figure 14:
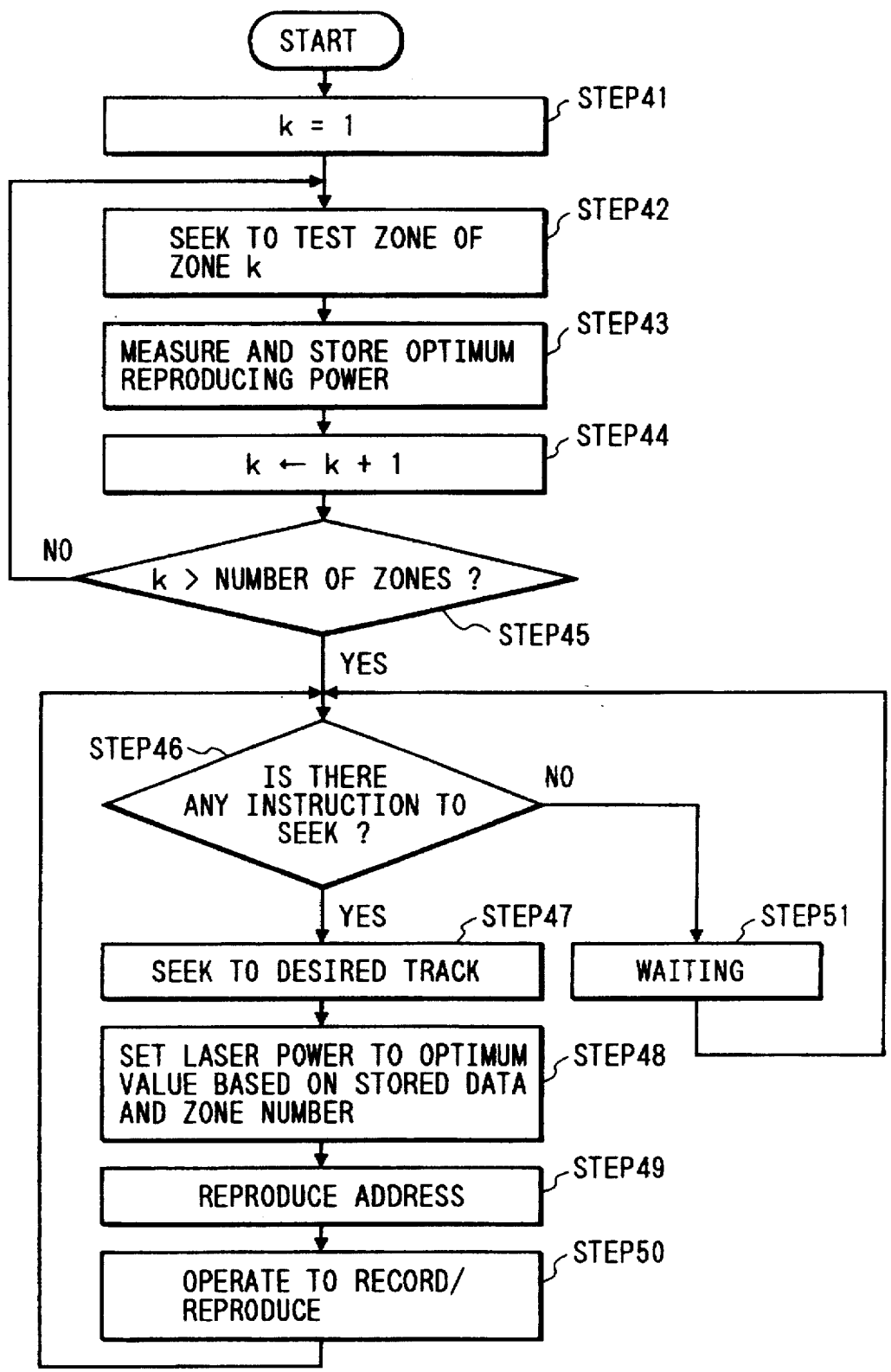
FIG. 14 is a flow chart for explaining the operation of the sixth embodiment of the present invention.

To solve this problem, therefore, one or more tracks in the innermost zone (or the outermost zone) in one or more zones are used as test tracks, and in power check an optimum reproducing power is obtained in these test tracks (see FIG. 14). In this method, the tracks provided for the test need only be several tracks in a whole disc. This results in almost no reduction in the capacity of a disc and allows an easy-to-perform recording/reproducing test.

[Seventh Embodiment]

Figure 15:
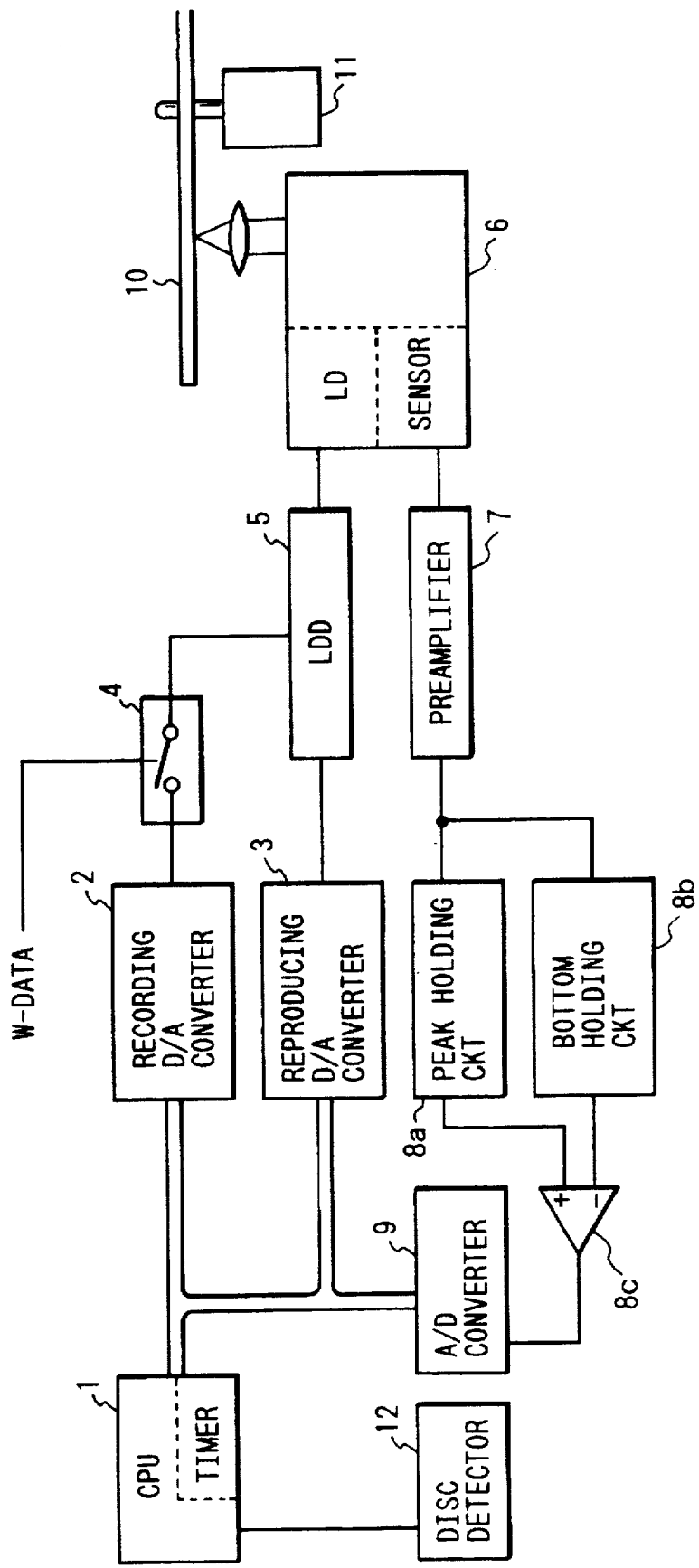
FIG. 15 is a block diagram for explaining the seventh embodiment of the present invention.

FIG. 15 is a block diagram for explaining the seventh embodiment of the present invention. In FIG. 15, the same reference numerals as in FIG. 10 denote parts having the same functions, and a detailed description thereof will be omitted. A part added to the arrangement in FIG. 10 is a disc detector 12.

In this embodiment, when the disc detector 12 detects loading of a disc, a CPU 1 adjusts focusing control and tracking control and then obtains optimum recording power Pw at certain reproducing power in an inner test zone and/or outer test zone shown in FIG. 11. Thereafter, the CPU 1 reproduces a signal, which is recorded with Pw, at several levels of reproducing power, thereby obtaining reproducing power Pr by which the highest signal level is given. The CPU 1 also operates an internal or external timer before or after the calculations of Pw and Pr.

Figure 16:
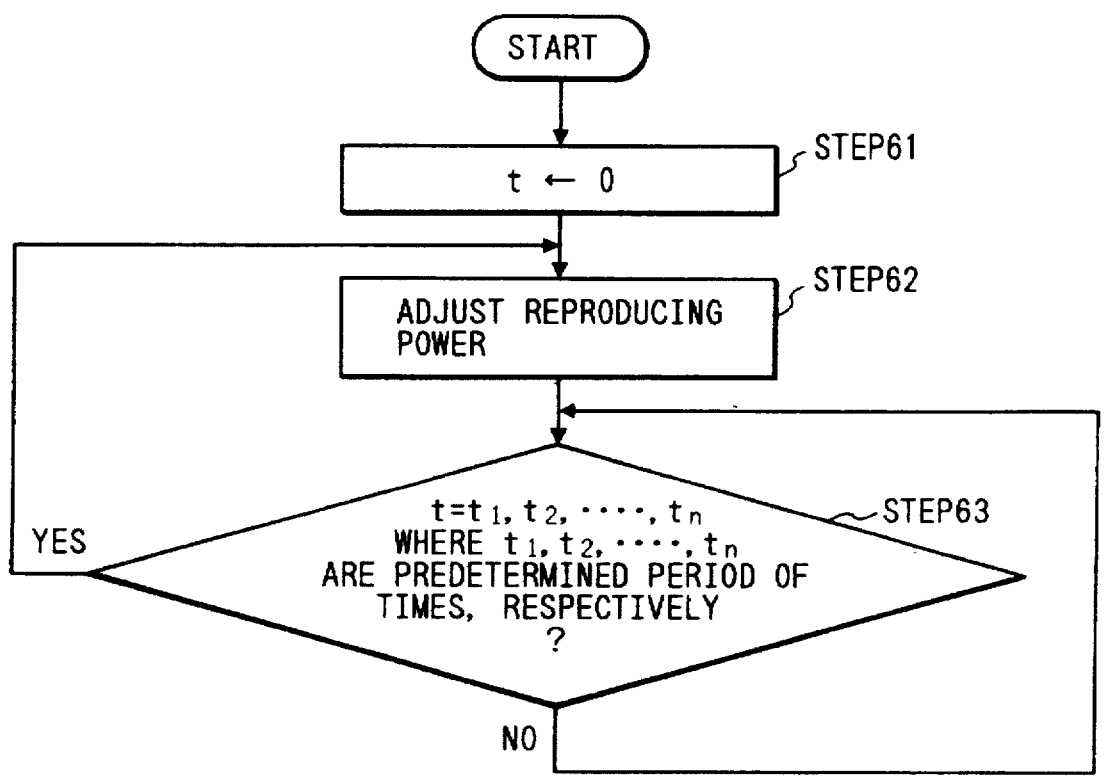
FIG. 16 is a flow chart for explaining the operation of the seventh embodiment of the present invention.

At this time stable information reproduction is possible because the reproducing power Pr is adjusted to an optimum value. Thereafter, the state of reproduction varies as the disc temperature approaches the internal temperature of the drive with time. However, a time required for the temperature rise of the disc and a time required for the temperature to reach an equilibrium are known in advance to certain degrees. Therefore, stable information reproduction is possible at all times by adjusting the reproducing power to an optimum value several times at each predetermined period of time from disk loading to thermal equilibrium following the same adjustment procedure (see FIG. 16).

As discussed above, by adjusting the reproducing power several times in accordance with the temperature rise after disc loading, an optimum super-resolving effect can be obtained at any instant. This permits reproduction of a pit with a higher density than the optical resolving power of a spot.

[Eighth Embodiment]

The eighth embodiment of the present invention will be described in detail below with reference to FIG. 17. Note that the same reference numerals as in FIG. 15 denote parts having the same functions in FIG. 17, and a detailed description thereof will be omitted. A part added to the arrangement in FIG. 15 is a disc temperature detector 13.

Figure 18:
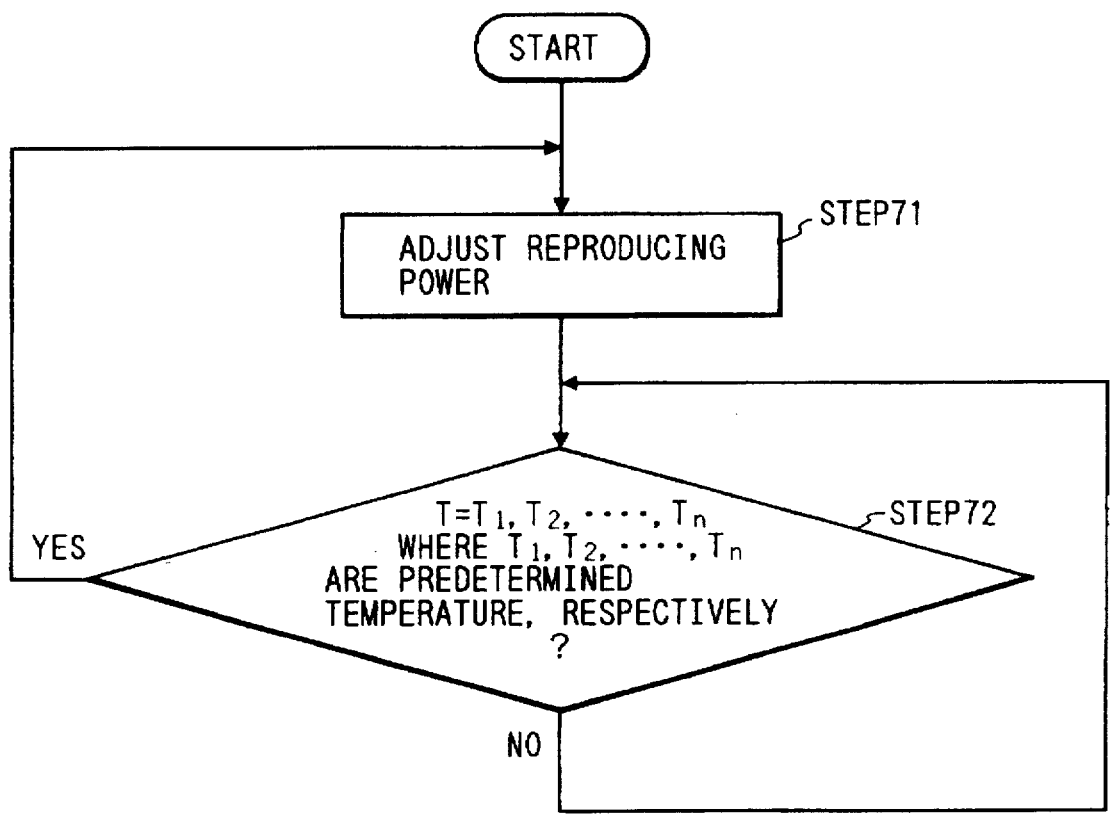
FIG. 18 is a flow chart for explaining the operation of the eighth embodiment of the present invention.

This embodiment is identical with the seventh embodiment in that the optimum reproducing power is obtained by detecting loading of a disc. However, the temperature of a disc just after loading is detected by the disc temperature detector 13 and supplied to a CPU 1 without using a timer. When the disc temperature rises after that, this temperature rise can be detected by the disc temperature detector 13. Therefore, information reproduction can be constantly performed under optimum conditions by adjusting the reproducing power for each predetermined temperature rise (see FIG. 18).

Although the disc temperature is detected in this embodiment, if the temperature of a disc is difficult to detect, nearly the same effect as discussed above can be obtained by performing an identical operation by detecting the temperature of a disc cartridge.

[Ninth Embodiment]

Figure 17:
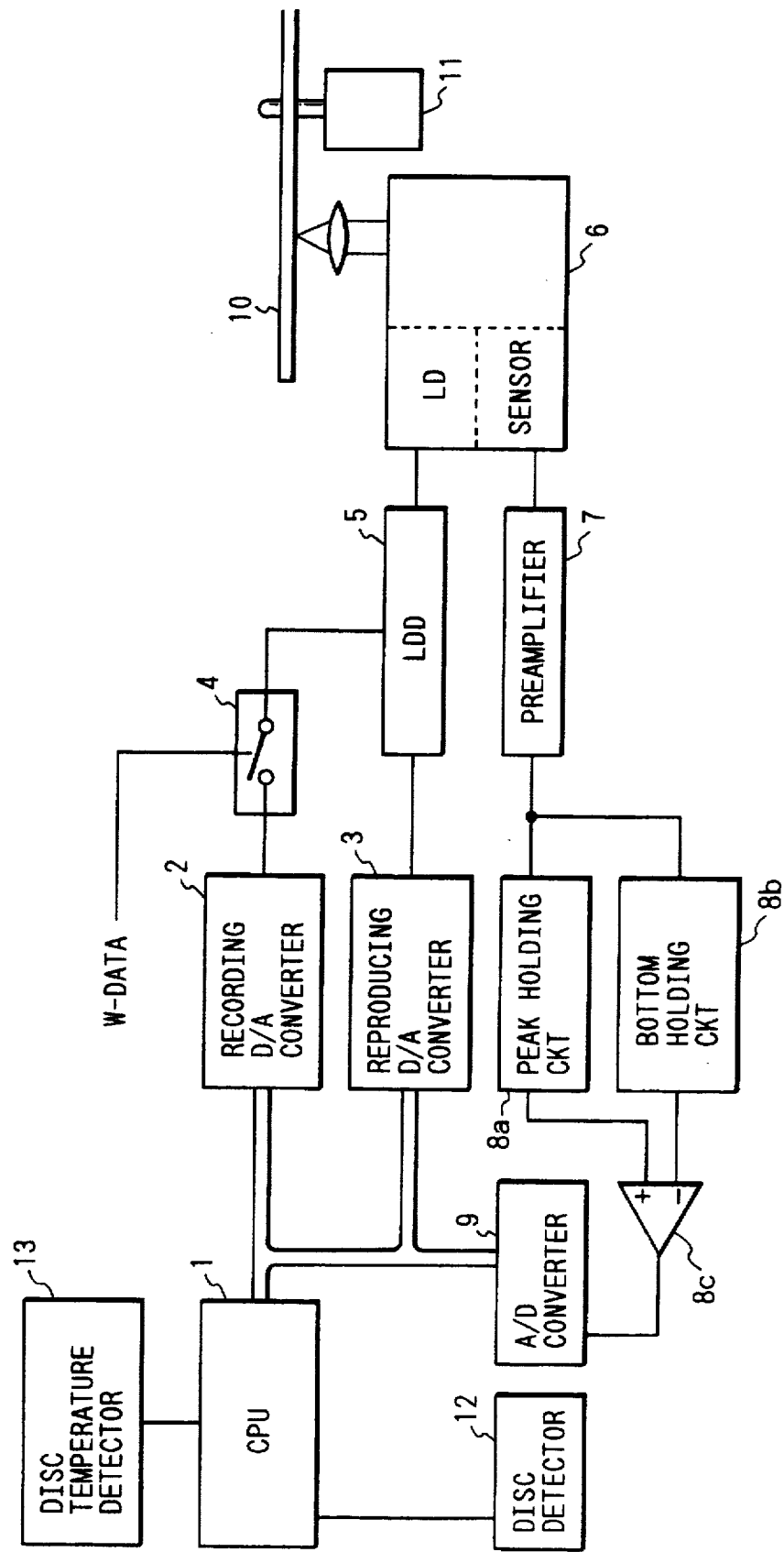
FIG. 17 is a block diagram for explaining the eighth and ninth embodiments of the present invention.

The present invention can employ still another method by using the same arrangement as in FIG. 17.

The ninth embodiment of the present invention is identical with the eighth embodiment in that the reproducing power is adjusted by detecting disc loading and the disc temperature at that time is monitored. In this embodiment, however, the reproducing power when the disc temperature rises is obtained by a calculation. This calculation is based on the assumption that the temperature rise of a disc upon irradiation with a reproducing beam is directly proportional to the intensity of the reproducing beam. That is, assuming the disc temperature and the optimum reproducing beam intensity upon loading of a disc are T0 and Pr0, respectively, the maximum temperature of a medium in a spot is Tr, and the disc temperature and the optimum reproducing beam intensity after an elapse of t minutes are T1 and Pr1, respectively, the following equation is derived:

$$Pr1 \cdot (Tr-T0) = Pr0 \cdot (Tr-T1)$$

Therefore, assuming that the maximum temperature Tr of a medium is known, it is possible to obtain the optimum reproducing power from the result of adjustment of the reproducing power just after loading and from the disc temperature detected after that. This makes it possible to constantly set the reproducing power in an optimum state. If the maximum temperature Tr is unknown, on the other hand, the same adjustment as in the seventh embodiment is performed just after disc loading and after the temperature rises a predetermined amount. Consequently, Tr and Pr1 can be calculated simultaneously.

Note that in this embodiment, as in the eighth embodiment, it is naturally possible to use the temperature of a disc cartridge instead of the temperature of a disc.

[Tenth Embodiment]

Figure 19:
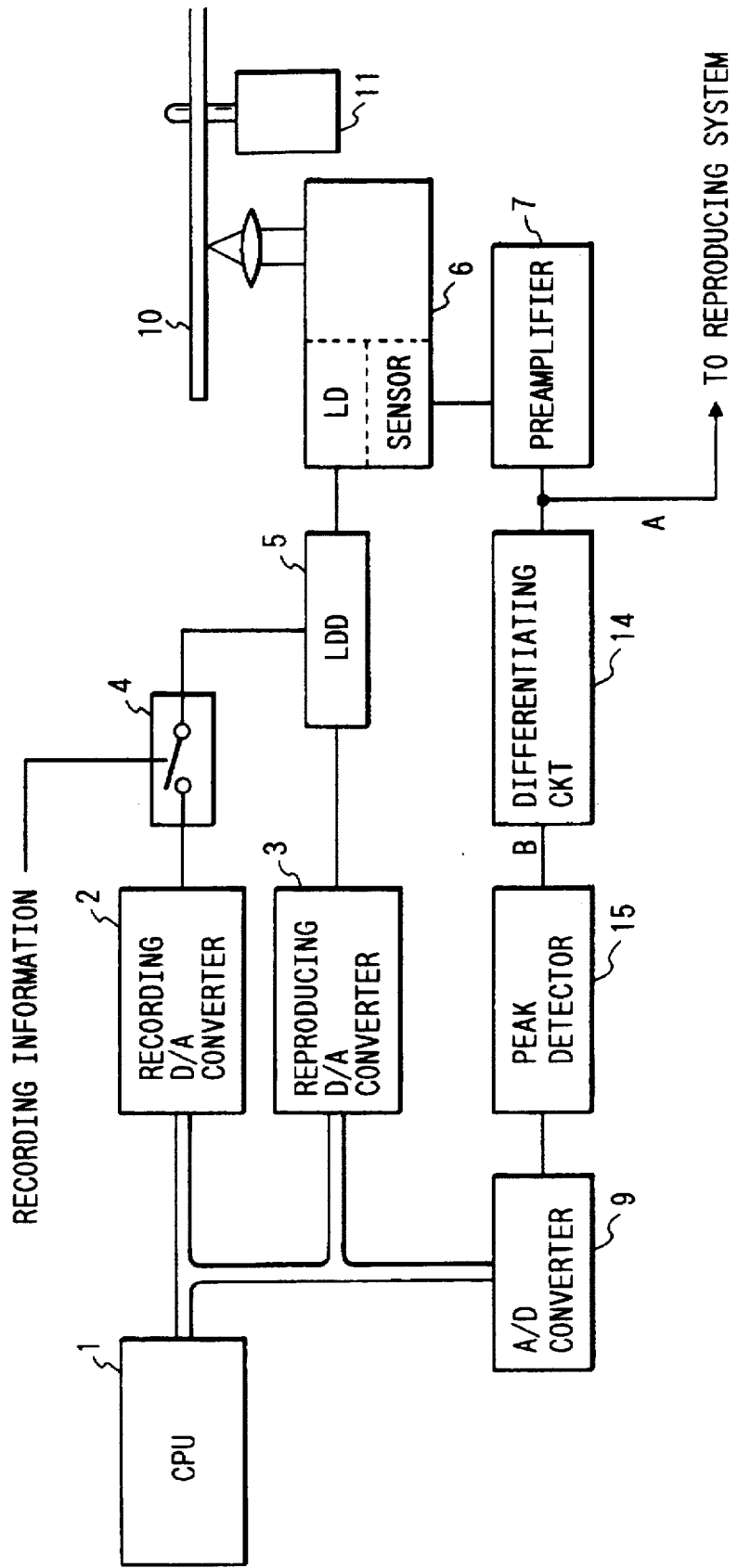
FIG. 19 is a block diagram for explaining the tenth embodiment of the present invention.

FIG. 19 is a block diagram for explaining the tenth embodiment of the present invention. In FIG. 19, the same reference numerals as in FIG. 10 denote parts having the same functions, and a detailed description thereof will be omitted. Parts added to the arrangement in FIG. 10 are a differentiating circuit 14 and a peak detector 15.

Figure 20:
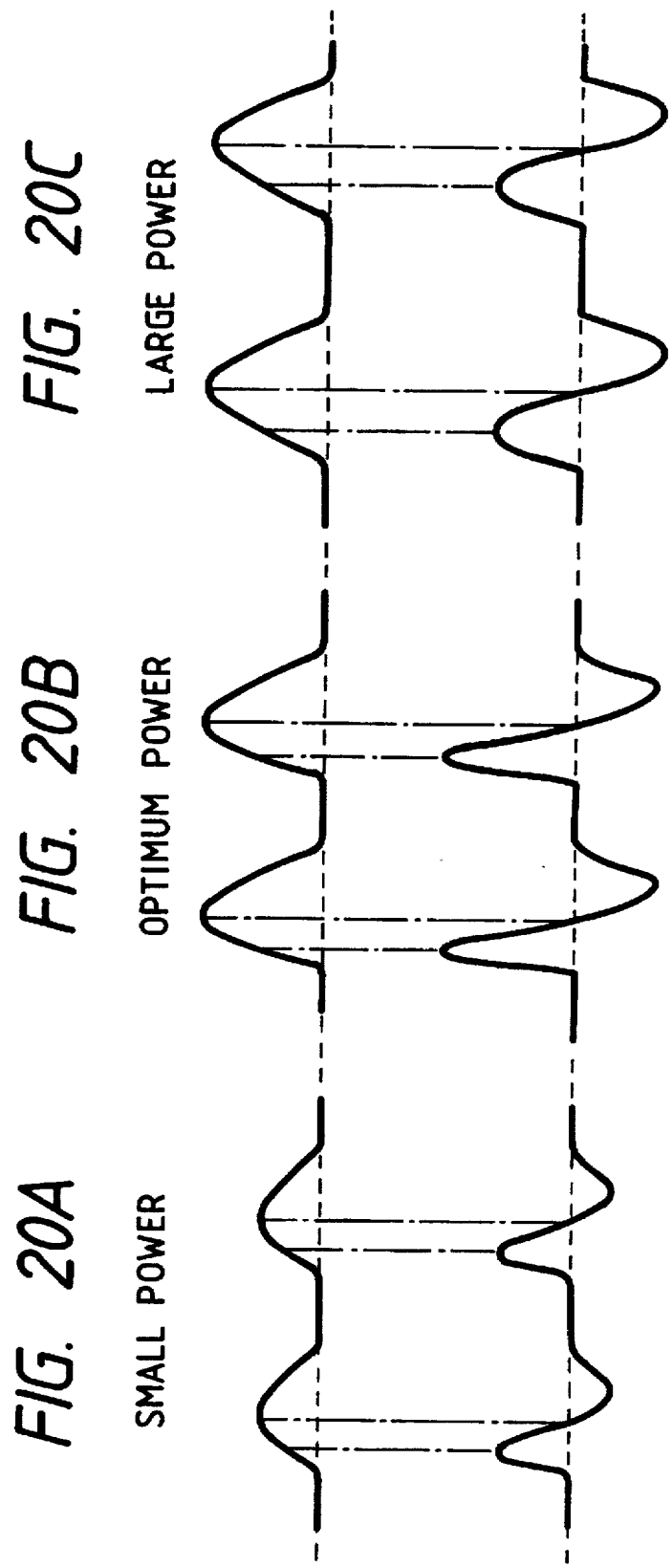
FIGS. 20A to 20C are views showing signal waveforms in the arrangement shown in FIG. 13.

Referring to FIG. 19, an output A from a preamplifier 7 is supplied to a reproducing system and at the same time differentiated by the differentiating circuit 14 to yield a differential output B. The level of the differential output B is supplied to a CPU 1 via the peak detector 15 and an A/D converter 9. FIGS. 20A to 20C show changes in the preamplifier output A and the differential output B when an isolated pit recorded in a RAD disc is reproduced while the power is varied in several steps by the CPU 1. FIG. 20B shows the preamplifier output A and the differential output B when the reproducing power is set at an optimum value. The leading and trailing edges of the reproduction signal are asymmetrical for the reason explained below.

The intensity distribution of a reproducing beam on a disc usually takes the form of a Gaussian distribution, and so the reproduction waveform is moderate at both the leading and trailing edges in general discs of no super resolution format. In the case of an aperture of a RAD disc, the trailing edge is similarly moderate since it can be considered to be identical with that in a general disc. However, as is apparent from FIG. 6B discussed earlier, a sufficient quantity of light is obtained on the boundary of the aperture at the leading edge. Therefore, the waveform rises steeply as illustrated in FIG. 20B. Consequently, the differential waveform of that waveform is large on the positive side and small on the negative side.

Figure 6A:
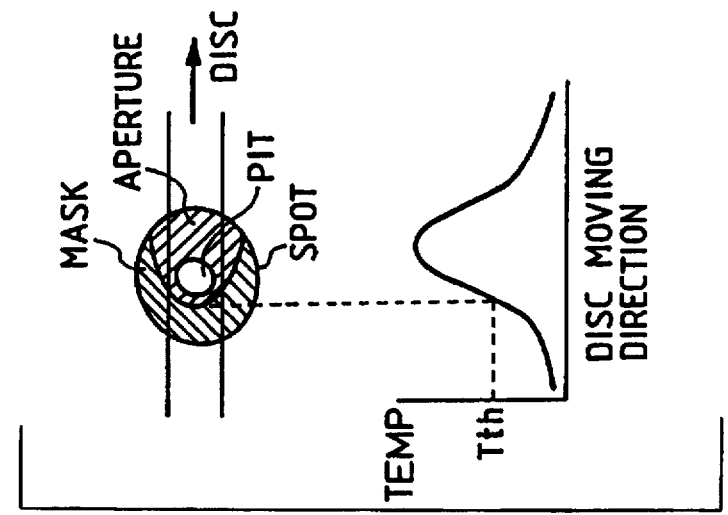
FIGS. 6A to 6C are views for explaining conventional problem (3)
Figure 6B:
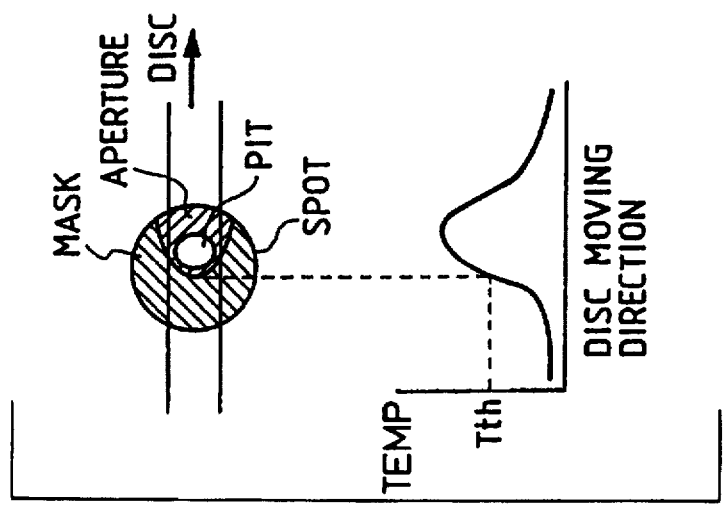

In the case of an aperture as in FIG. 6A when the reproducing power is small, the amplitude of the reproduction signal is small and the leading edge is moderate because the aperture is too small. Therefore, as shown in FIG. 20A, the levels of both the preamplifier output A and the differential output B are small.

Figure 6C:
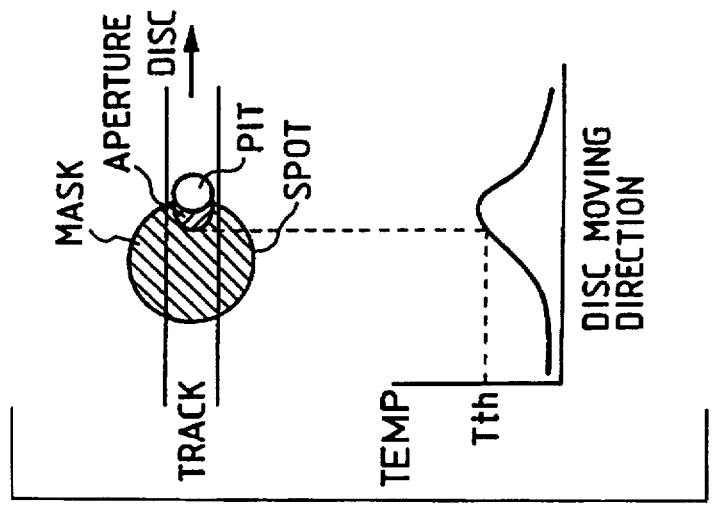

In contrast, when the reproducing power is increased, the aperture becomes too large as in FIG. 6C. Consequently, the resolving power for a minimum pit decreases, and the amplitude of the preamplifier output A does not increase in proportion to an increase in the quantity of light. Additionally, since the leading edge becomes moderate as the aperture increases in size, the amplitude of the differential signal B decreases. The shortest pit is used in adjustment of the reproducing power in order to utilize the reduction in the resolving power with respect to the unnecessary expansion of the aperture.

Figure 21:
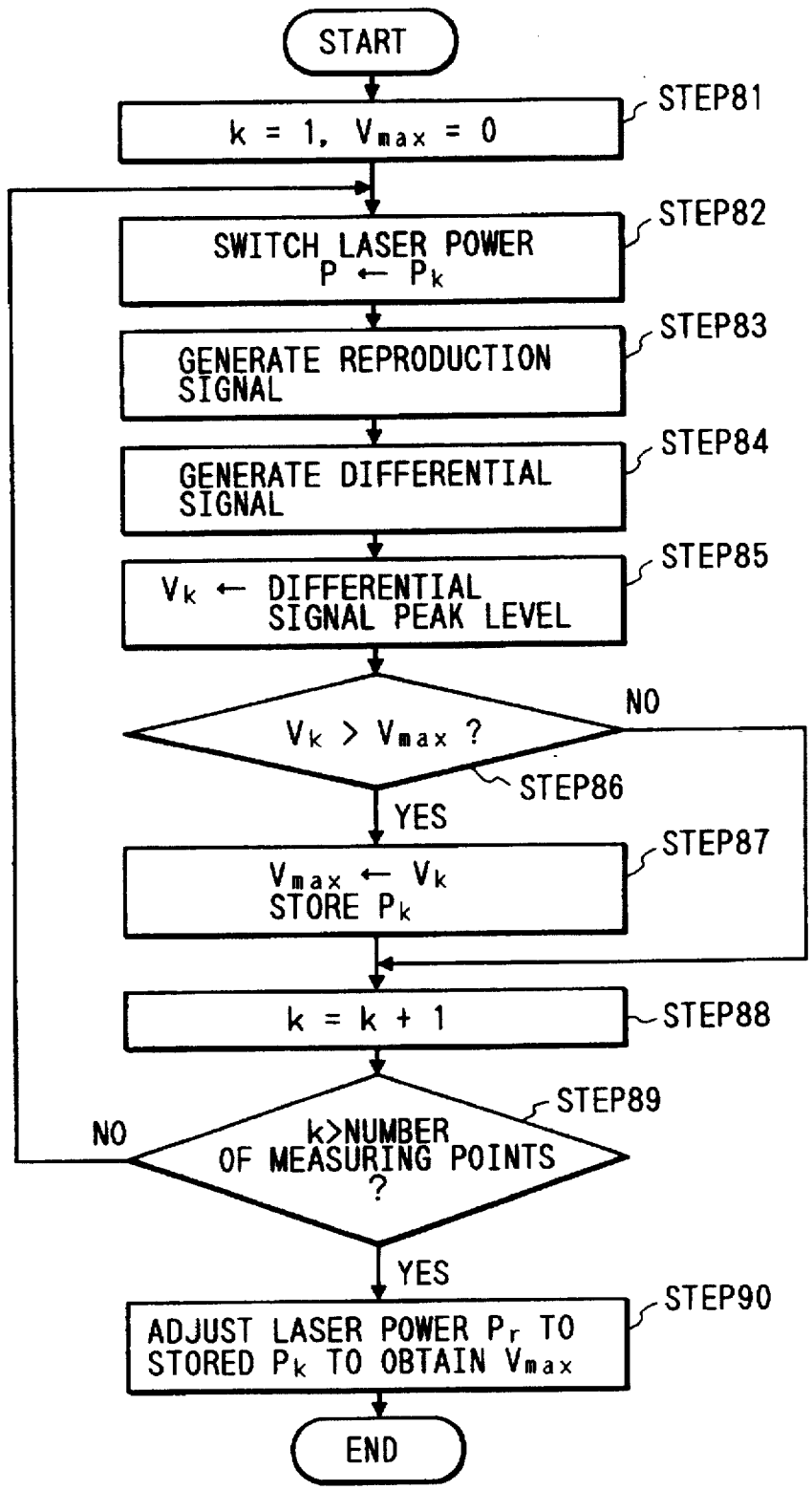
FIG. 21 is a flow chart for explaining the operation of the tenth embodiment of the present invention.

Taking the above fact into account, in adjusting the recording power in a test zone upon loading of a disc, the peak level of the differential signal B of the reproduction signal is supplied to the CPU 1 by using the A/D converter 9, and the reproducing power is so adjusted that the level is at a maximum. This allows stable information reproduction independent of the difference between discs or an error in laser power control (see FIG. 21).

This embodiment has been explained by taking RAD as an example. In reproduction of a FAD-type disc, however, an identical effect can naturally be obtained by performing adjustment such that the differential signal is at a maximum level by focusing attention on the trailing edge of the reproduction signal.

[11th Embodiment]

Figure 22:
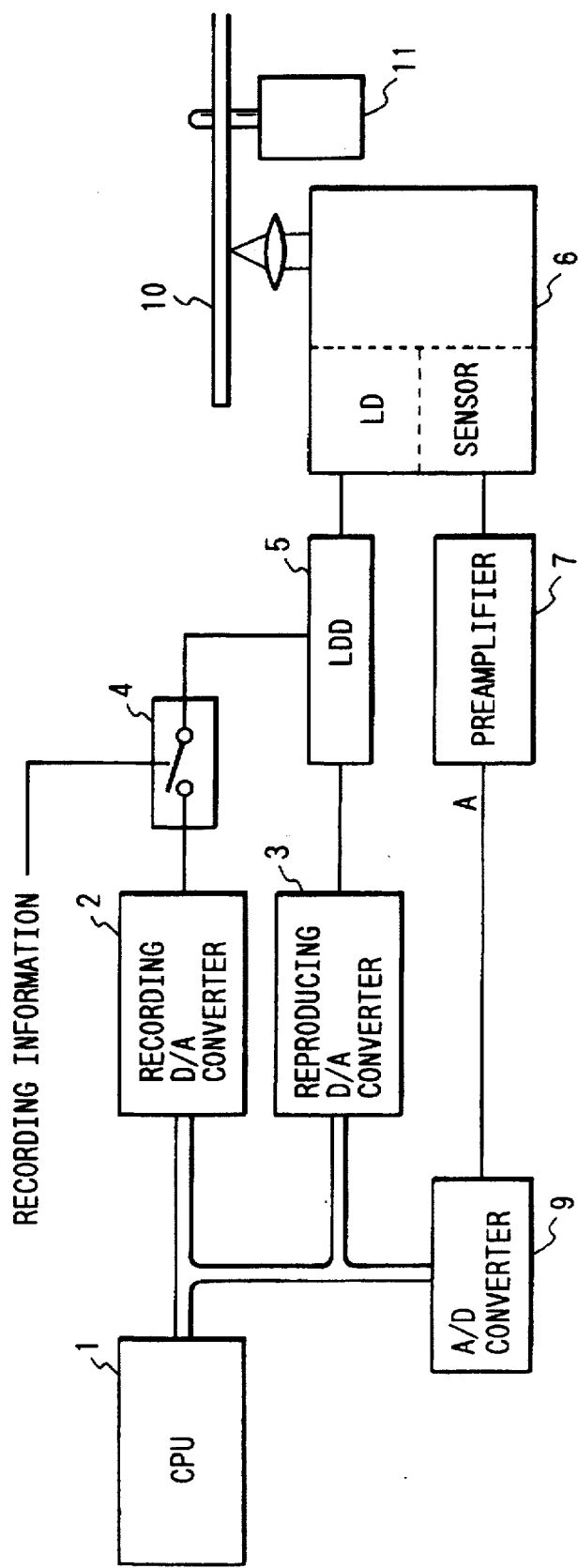
FIG. 22 is a block diagram for explaining the 11th embodiment of the present invention.

The 11th embodiment of the present invention will be described in detail below with reference to FIG. 22. Note that the same reference numerals as in FIG. 19 denote parts having the same functions in FIG. 22, and a detailed description thereof will be omitted. The arrangement in FIG. 22 differs from the arrangement in FIG. 19 in that a preamplifier output A is directly supplied to an A/D converter 9.

Recently, several methods of digitally processing reproduction signals have been proposed. In these methods, signal processing is done by using an A/D converter with a conversion speed nearly equal to the frequency (about 10 to 50 MHz) of a reproduction signal. Fortunately, many common A/D converters have a speed (several hundred MHz) several times higher than that speed. Therefore, it is possible to perform A/D conversion of several points for the shortest isolated pit by the use of these high-speed A/D converters. In this case, the difference between current data and immediately preceding data upon each A/D conversion corresponds to the level of a differential signal in the tenth embodiment. Therefore, a CPU 1 detects this difference and adjusts the reproducing power while monitoring the maximum value of the difference. Consequently, an effect equal to that in the tenth embodiment can be obtained (see FIG. 23).

Note that in each of the above embodiments, the accuracy of adjustment can be further improved by determining the optimum reproducing power and readjusting the recording power in accordance with the optimum reproducing power determined.

What is claimed is:

1. An optical information recording/reproducing apparatus in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing

19 layer side, thereby reproducing the information held by the recording layer by transferring the information to the reproducing layer only in a portion of the beam spot, said apparatus comprising:
- a light source for generating the laser beam;
- a drive circuit for driving said light source to adjust an intensity of the laser beam;
- means for reproducing information previously recorded on a control track on the recording medium and which indicates a relation of the intensity of the laser beam to a radial position of the recording medium upon reproduction; and
- control means for adjusting the intensity of the laser beam by controlling said drive circuit on the basis of the reproduced information indicating the relation of the intensity of the laser beam to the radial position on the recording medium.

2. An optical information recording/reproducing apparatus for use with a magnetooptical recording medium formed by stacking at least a recording layer, which includes of a perpendicular magnetization film for magnetically holding information, and a reproducing layer to which the information of the recording layer is transferred, the recording medium having a plurality of tracks and being divided into a plurality of zones with a buffer region provided between adjacent zones, in which, while the recording medium is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, said apparatus comprising:
- a light source for generating the laser beam;
- a drive circuit for driving said light source to adjust an intensity of the laser beam; and
- control means for adjusting an intensity of the laser beam upon reproduction,
- wherein said control means adjusts the intensity of the laser beam upon reproduction such that a predetermined pattern is recorded on the buffer region using the laser beam, and the recorded predetermined pattern is reproduced while changing the intensity of the laser beam to obtain a reproduction signal, and said drive circuit is controlled on the basis of a level of the reproduction signal.

3. An optical information recording/reproducing apparatus for use with a magnetooptical recording medium formed by stacking at least a recording layer, which includes a perpendicular magnetization film for magnetically holding information, and a reproducing layer to which the information of the recording layer is transferred, the recording medium having a plurality of tracks and being divided into a plurality of zones, in which, while the recording medium is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, said apparatus comprising:
- a light source for generating the laser beam;
- a drive circuit for driving said light source to adjust an intensity of the laser beam; and
- control means for adjusting an intensity of the laser beam upon reproduction,
- wherein said control means adjusts the intensity of the laser beam upon reproduction such that a predetermined pattern is recorded using the laser beam on a region of the recording medium including at least an inner most track in each zone of the recording medium, and the recorded predetermined pattern is reproduced while changing the intensity of the laser beam to obtain a reproduction signal, and said drive circuit is controlled on the basis of the level of the reproduction signal.

4. An optical information recording/reproducing apparatus in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, said apparatus comprising:
- a light source for generating the laser beam;
- a drive circuit for driving said light source to adjust an intensity of the laser beam;
- determining means for determining an intensity of the laser beam upon reproduction at each of a plurality of points on the recording medium;
- processing means for calculating the intensity of the laser beam upon reproduction for a recording area entirely on the recording medium by polynomial approximation by using the intensity of the laser beam upon reproduction determined at each of the plurality of points; and
- control means for adjusting the intensity of the laser beam upon reproduction by controlling said drive circuit on the basis of the calculated intensity of the laser beam upon reproduction.

5. An apparatus according to claim 4, wherein the polynomial approximation is performed on the basis of an equation below:

$$Pr(R)=a_{n-1} \cdot R^{n-1}+a_{n-2} \cdot R^{n-2}+\ldots+a_1 \cdot R+a_0$$

where Pr is the intensity of a laser beam, R is the radial position, and $a_0 \ldots a_{n-1}$ are constants.

6. An apparatus according to claim 4, wherein the recording medium includes a plurality of tracks and is divided into a plurality of zones, buffer regions for recording being respectively provided between adjacent zones, and the plurality of points being present in the buffer regions.

7. An apparatus according to claim 4, wherein the recording medium includes a plurality of tracks and is divided into a plurality of zones, and the plurality of points being present in regions each of which includes at least an inner most track in each zone of the recording medium.

8. An optical information recording/reproducing apparatus in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, said apparatus comprising:
- a light source for generating the laser beam;

a drive circuit for driving said light source to adjust an intensity of the laser beam;

determining means for recording a predetermined pattern on the recording medium using the laser beam, for reproducing the recorded predetermined pattern while changing the intensity of the laser beam to obtain a reproduction signal, and for determining an intensity of the laser beam upon reproduction on the basis of a level of the reproduction signal;

control means for adjusting the intensity of the laser beam upon reproduction of the information by controlling said drive circuit in accordance with the determined intensity of the laser beam; and a timer for measuring time elapsed in reproduction of the information, wherein said determining means determines the intensity of the laser beam for a predetermined period of time on the basis of an elapsed time measured by said timer.

9. An optical information recording/reproducing apparatus in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, said apparatus comprising:

a light source for generating the laser beam;

a drive circuit for driving said light source to adjust an intensity of the laser beam;

detecting means for detecting a temperature inside said apparatus;

determining means for recording a predetermined pattern on the recording medium using the laser beam, for reproducing the recorded predetermined pattern while changing the intensity of the laser beam to obtain a reproduction signal, and for determining an intensity of the laser beam upon reproduction, on the basis of a level of the reproduction signal, every time the detected temperature increases by a predetermined value; and control means for adjusting the intensity of the laser beam upon reproduction of the information by controlling said drive circuit in accordance with the determined intensity of the laser beam.

10. An optical information recording/reproducing apparatus in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, said apparatus comprising:

a light source for generating the laser beam;

a drive circuit for driving said light source to adjust an intensity of the laser beam;

reproducing means for reproducing information recorded on the recording medium and for generating a reproduction signal by controlling said drive circuit to vary the intensity of the laser beam;

differentiating means for differentiating the reproduction signal to output a differential signal;

detecting means for detecting a level of the differential signal;

determining means for determining, as an intensity of the laser beam upon reproduction, a particular intensity of the laser beam at which a maximum level of the differential signal is obtained; and control means for adjusting the intensity of the laser beam by controlling said drive circuit in accordance with the determined intensity of the laser beam upon reproduction.

11. An optical information recording/reproducing apparatus in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, said apparatus comprising:

a light source for generating the laser beam;

a drive circuit for driving said light source to adjust an intensity of the laser beam;

reproducing means for reproducing information recorded on the recording medium and for generating an analog reproduction signal by controlling said drive circuit to vary the intensity of the laser beam;

converting means for converting the analog reproduction signal into a digital signal having a frequency higher than a frequency of the analog reproduction signal;

determining means for detecting a difference between a level of the converted digital signal and a level of a most recent prior converted digital signal every time conversion is performed, and determining, as an intensity of the laser beam upon reproduction, a particular intensity of the laser beam at which a maximum value of the difference is obtained; and control means for adjusting the intensity of the laser beam by controlling said drive circuit in accordance with the determined intensity of the laser beam upon reproduction.

12. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, where the laser beam is generated by a light source which is driven by a drive circuit, said method comprising the steps of:

reproducing information previously recorded on a control track on the recording medium and which indicates a relation of an intensity of the laser beam to a radial position of the recording medium upon reproduction; and adjusting the intensity of the laser beam upon reproduction by controlling the drive circuit on the basis of the reproduced information indicating the relation.

13. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, wherein the recording medium is provided with a plurality of tracks and is divided into a plurality of zones, and a buffer region is provided between adjacent zones, where the laser beam is generated by a light source which is driven by a drive circuit, said method comprising the steps recording a predetermined pattern on the buffer region using the laser beam and reproducing the recorded pattern to obtain a reproduction signal while changing an intensity of the laser beam, and determining an intensity of the laser beam upon reproduction on the basis of a level of the reproduction signal; and adjusting the intensity of the laser beam upon reproduction by controlling the drive circuit in accordance with the determined intensity of the laser beam.

14. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, wherein the recording medium is provided with a plurality of tracks and is divided into a plurality of zones, where the laser beam is generated by a light source which is driven by a drive circuit, said method comprising the steps of:

recording a predetermined pattern on a region of the recording medium which includes at least an inner most track in each zone by use of the laser beam and reproducing the recorded pattern while changing an intensity of the laser beam to obtain a reproduction signal, and determining the intensity of the laser beam on the basis of a level of the reproduction signal; and adjusting an intensity of the laser beam upon reproduction by controlling the drive circuit in accordance with the determined intensity of the laser beam.

15. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, where the laser beam is generated by a light source which is driven by a drive circuit, said method comprising the steps of:

determining an intensity of the laser beam upon reproduction at each of a plurality of points on the recording medium;

calculating the intensity of the laser beam upon reproduction for a recording area entirely on the recording medium by polynomial approximation by using the intensity of the laser beam determined at each of the plurality of points; and adjusting the intensity of the laser beam upon reproduction by controlling the drive circuit on the basis of the calculated intensity of the laser beam.

16. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, where the laser beam is generated by a light source which is driven by a drive circuit, said method comprising the steps of:

recording a predetermined pattern on the recording medium using the laser beam, reproducing the recorded predetermined pattern while changing an intensity of the laser beam to obtain a reproduction signal, and determining an intensity of the laser beam upon reproduction on the basis of the level of a reproduction signal;

adjusting the intensity of the laser beam upon reproduction by controlling the drive circuit in accordance with the determined intensity of the laser beam; and measuring time elapsed in reproduction, wherein the intensity of the laser beam is determined for a predetermined time in said determining step, on the basis of the elapsed time measured in said measuring step.

17. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, where the laser beam is generated by a light source which is driven by a drive circuit, said method comprising the steps of:

recording a predetermined pattern on the recording medium using the laser beam, reproducing the recorded predetermined pattern while changing an intensity of the laser beam to obtain a reproduction signal, and determining an intensity of the laser beam upon reproduction on the basis of a level of a reproduction signal;

adjusting the intensity of the laser beam upon reproduction by controlling the drive circuit in accordance with the determined intensity of the laser beam; and detecting a temperature inside an information recording/ reproducing apparatus by using a temperature detector provided inside the apparatus, wherein the intensity of the laser beam is determined for a predetermined increment of temperature in said determining step, on the basis of the detected temperature.

18. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of a beam spot, where the laser beam is generated by a light source which is driven by a drive circuit, said method comprising the steps of:

reproducing information recorded on the recording medium while varying an intensity of the laser beam to generate a reproduction signal;

differentiating the reproduction signal to output a differential signal;

detecting a level of the differential signal;

determining, as an intensity of the laser beam upon reproduction, a particular intensity of the laser beam at which a maximum level of the differential signal is obtained; and adjusting the intensity of the laser beam by controlling the drive circuit in accordance with the determined intensity of the laser beam upon reproduction.

19. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, where the laser beam is generated by a light source which is driven by a drive circuit, said method comprising the steps of:

reproducing information recorded on the recording medium while varying an intensity of the laser beam to generate an analog reproduction signal;

converting the analog reproduction signal into a digital signal having a frequency higher than a frequency of the analog reproduction signal;

detecting a difference between a level of the converted digital signal and a level of a most recent prior converted digital signal every time conversion is performed, and determining, as an intensity of the laser beam upon reproduction, a particular intensity of the laser beam at which a maximum value of the difference is obtained; and adjusting the intensity of the laser beam by controlling the drive circuit in accordance with the determined intensity of the laser beam upon reproduction.

20. An apparatus according to claim 4, wherein the recording medium includes a plurality of tracks and is divided into a plurality of zones, and the plurality of points are present in regions each of which includes at least an outer most track in each zone of the recording medium.

21. An optical information recording/reproducing apparatus in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, wherein the recording medium is provided with a plurality of tracks and is divided into a plurality of zones, said apparatus comprising:

a light source for generating the laser beam;

a drive circuit for driving said light source to adjust an intensity of the laser beam; and control means for adjusting an intensity of the laser beam upon reproduction, wherein said control means adjusts the intensity of the laser beam upon reproduction such that a predetermined pattern is recorded using the laser beam on a region of the recording medium including at least an outer most track in each zone of the recording medium, and the recorded predetermined pattern is reproduced while changing the intensity of the laser beam to obtain a reproduction signal, and said drive circuit is controlled on the basis of the level of said reproduction signal.

22. An optical information recording/reproducing apparatus in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, said apparatus comprising:

a light source for generating the laser beam;

a drive circuit for driving said light source to adjust an intensity of the laser beam;

determining means for determining an intensity of the laser beam upon reproduction at each of a plurality of points on the recording medium;

processing means for calculating the intensity of the laser beam upon reproduction for a recording area entirely on the recording medium by linear interpolation by using the intensity of the laser beam upon reproduction determined at each of the plurality of points; and control means for adjusting the intensity of the laser beam upon reproduction by controlling said drive circuit on the basis of the calculated intensity of the laser beam upon reproduction.

23. An apparatus according to claim 22, wherein the recording medium includes a plurality of tracks and is divided into a plurality of zones, and the plurality of points are present in regions of the recording medium, each of which includes at least an inner most track in each zone of the recording medium.

24. An apparatus according to claim 22, wherein the recording medium includes a plurality of tracks and is divided into a plurality of zones, and the plurality of points are present in regions of the recording medium, each of which includes at least an outer most track in each zone of the recording medium.

25. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, wherein the recording medium is provided with a plurality of tracks and is divided into a plurality of zones, where the laser beam is generated by a light source which is driven by a drive circuit, said method comprising the steps of:

recording a predetermined pattern on a region of the recording medium including at least an outer most track in each zone by use of the laser beam, and reproducing the recorded pattern while changing an intensity of the laser beam to obtain a reproduction signal, and determining the intensity of the laser beam on the basis of a level of the reproduction signal; and adjusting the intensity of the laser beam upon reproduction by controlling the drive circuit in accordance with the determined intensity of the laser beam.

26. An optical information recording/reproducing method in which, while a magnetooptical recording medium formed by stacking at least a recording layer, which includes a perpendicular magnetization film for magnetically holding information, and a reproducing layer to which the information of the recording layer is transferred, is rotated at a fixed angular velocity, a laser beam is irradiated in the form of a beam spot onto the recording medium from the reproducing layer side, thereby reproducing the information held by the recording layer by transferring the information to the reproducing layer only in a portion of the beam spot, where the laser beam is generated by a light source which is driven by a drive circuit, said method comprising the steps of:

determining an intensity of the laser beam upon reproduction at each of a plurality of points on the recording medium;

calculating the intensity of the laser beam upon reproduction for a recording area entirely on the recording medium by linear interpolation by using the intensity of the laser beam determined at each of the plurality of points; and adjusting the intensity of the laser beam upon reproduction by controlling the drive circuit on the basis of the calculated intensity of the laser beam.

* * * * *

UNITED STATES PATENT AND TRADEMARK OFFICE
CERTIFICATE OF CORRECTION

PATENT NO. : 5,703,841
DATED : December 30, 1997
INVENTOR(S) : TOMOYUKI HIROKI

Figure 23:
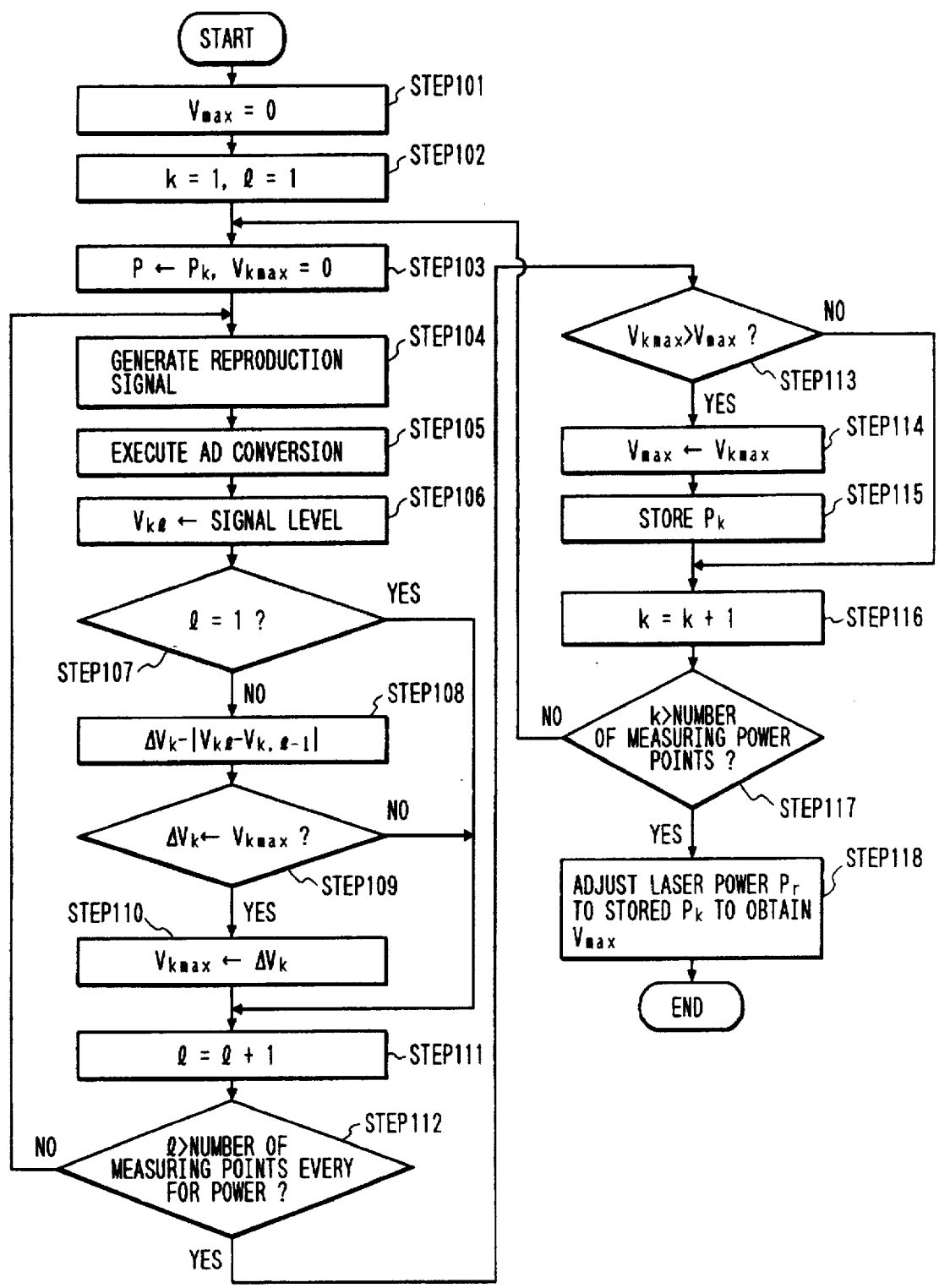
FIG. 23 is a flow chart for explaining the operation of the 11th embodiment of the present invention.

It is certified that error appears in the above-identified patent and that said Letters Patent is hereby corrected as shown below:

<u>IN THE DRAWING SHEETS</u>:

<u>In FIG. 23 (sheet 23 of 23)</u>:

In "STEP 112", "POINTS EVERY FOR POWER" should read --POINTS FOR EACH POWER--.

<u>IN THE DISCLOSURE</u>:

<u>COLUMN 12</u>:

Line 7, "need" should read --needs to--; and
Line 10, "need" should read --needs to--.

<u>COLUMN 16</u>:

Line 15, "time" should read --time,--.

<u>COLUMN 23</u>:
Line 16, "steps" should read --steps of:--

Signed and Sealed this

Fourteenth Day of July, 1998

Attest:

BRUCE LEHMAN

*Attesting Officer*          *Commissioner of Patents and Trademarks*